(12) United States Patent
Kohli et al.

(10) Patent No.: US 12,536,142 B2
(45) Date of Patent: *Jan. 27, 2026

(54) PROVIDING SCALABLE AND CONCURRENT FILE SYSTEMS

(71) Applicant: Microsoft Technology Licensing, LLC, Redmond, WA (US)

(72) Inventors: Jaspal Kohli, Sunnyvale, CA (US); Sunil Kumar Tekkatte Subramanya, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,378

(22) Filed: Mar. 25, 2024

(65) Prior Publication Data

US 2024/0264979 A1 Aug. 8, 2024

Related U.S. Application Data

(63) Continuation of application No. 16/813,353, filed on Mar. 9, 2020, now Pat. No. 11,971,861.

(60) Provisional application No. 62/819,263, filed on Mar. 15, 2019.

(51) Int. Cl.
*G06F 16/10* (2019.01)
*G06F 3/06* (2006.01)
*G06F 16/176* (2019.01)
*H04L 67/1097* (2022.01)

(52) U.S. Cl.
CPC ........ *G06F 16/1774* (2019.01); *G06F 3/0604* (2013.01); *G06F 3/0644* (2013.01); *G06F 3/067* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,634,124 A | * | 5/1997 | Khoyi | ................... G06F 16/289 |
| 6,519,615 B1 | * | 2/2003 | Wollrath | ............. G06F 12/0253 |
| | | | | 709/203 |
| 10,310,943 B2 | * | 6/2019 | Huang | ........................ G06F 3/06 |
| 2007/0261063 A1 | * | 11/2007 | Matousek | ........... G06F 11/1482 |
| | | | | 719/318 |
| 2018/0137139 A1 | * | 5/2018 | Bangalore | ............. H04L 67/568 |

* cited by examiner

*Primary Examiner* — Belix M Ortiz Ditren
(74) *Attorney, Agent, or Firm* — Alleman Hall & Tuttle LLP

(57) ABSTRACT

Techniques are disclosed for providing scalable and concurrent file systems. A backend storage system comprising an interface and a processing unit may be configured to perform the techniques. The interface may present the file system storing objects representative of data. The processing unit may receive, from a frontend host system coupled to the backend storage system, a plurality of client operations to perform with respect to the objects identified by the client operations, and identify an object type associated with each of the identified objects. The processing unit may select, based on the object types, one or more backend operators that implement the plurality of client operations, and apply the backend operators to the identified objects.

19 Claims, 10 Drawing Sheets

PROVIDING SCALABLE AND CONCURRENT FILE SYSTEMS

This application is a continuation of U.S. Non-Provisional patent application Ser. No. 16/813,353, filed Mar. 9, 2020, which claims priority to U.S. Provisional Application No. 62/819,263 filed Mar. 15, 2019, the entire contents of each of which are hereby incorporated by reference for all purposes.

TECHNICAL FIELD

This disclosure generally relates to computer networks and, more particularly, expansion file systems for computer networks.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network data or storage data. However, such processors are normally not designed for high-capacity network and storage workloads of modern networks and can be relatively poor at performing packet stream processing.

Furthermore, data centers may rely on file systems that require the processors to manage storage of the data, managing the reads, modifies, and writes of data to the file system through various operating system level interrupts and exceptions. In the context of a large-scale data center, operations to manage file systems and the storage, modification, and retrieval of data therefrom may consume significant portions of the processing cycles available to the processors (and other resources, such as control bus bandwidth, memory, etc.). Management of the file system may effectively limit the growth (in terms of size) of the file system (as the processors can only dedicate so many processing cycles to file system management), preventing the file system from scaling and thereby limiting data centers from handling new contexts that involve widespread frequent data collection.

SUMMARY

In general, the disclosure describes techniques that enable data centers to implement a distributed file system that facilitates scale out in at least two dimensions (e.g., in terms of the amount of data capable of being stored to the file system, and the number of concurrent—or in other words, parallel—access to the file system). The techniques may distribute operations within the file system to permit highly parallel access to the underlying objects through use of what may be referred to as "smart objects." Smart objects may refer to objects for which there are associated functions (or, in other words, operators) that differ based on the type of the corresponding object. Rather than resort to the requesting entities within the data center managing the underlying operations required to access the file system (e.g., managing locks and serialization, and other operations), the techniques may distribute the underlying operations required to access the file system to entities responsible for owning or managing the objects to which such operations are to be applied. The ownership aspect of the techniques may allow the responsible entities to serialize execution of the operations so as to potentially reduce a number of locks required to access the data and thereby potentially increase availability of object access in a manner the promotes highly parallel access.

In one example, various aspects of the techniques are directed to a method of managing a file system, the method comprising: receive, by a backend storage system that manages the file system storing objects representative of data and from a frontend host system coupled to the backend storage system, a plurality of client operations to perform with respect to the objects identified by the client operations; identifying, by the backend storage system, an object type associated with each of the identified objects; selecting, by the backend storage system and based on the object types, one or more backend operators that implement the plurality of client operations; and applying, by the backend storage system, the backend operators to the identified objects.

In another example, various aspects of the techniques are directed to a backend storage system configured to manage a file system, the backend storage system comprising: an interface configured to present the file system storing objects representative of data, and one or more processing units configured to: receive, from a frontend host system coupled to the backend storage system, a plurality of client operations to perform with respect to the objects identified by the client operations; identify an object type associated with each of the identified objects; select, based on the object types, one or more backend operators that implement the plurality of client operations; and apply the backend operators to the identified objects.

In another example, various aspects of the techniques are directed to a non-transitory computer-readable storage medium having stored thereon instructions that, when executed, cause one or more processors of a backend storage system to: present a file system storing objects representative of data, and receive, from a frontend host system coupled to the backend storage system, a plurality of client operations to perform with respect to the objects identified by the client operations; identify an object type associated with each of the identified objects; select, based on the object types, one or more backend operators that implement the plurality of client operations; and apply the backend operators to the identified objects.

In another example, various aspects of the techniques are directed to a storage system configured to manage a file system, the storage system including: a frontend host system configured to transmit a plurality of client operations to perform with respect to objects of the file system identified by the client operations; a backend storage system comprising one or more processing units, the one or more processing units configured to: receive the plurality of client operations; identify an object type associated with each of the identified objects; select, based on the object types, one or more backend operators that implement the plurality of client operations; and apply the backend operators to the identified objects.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
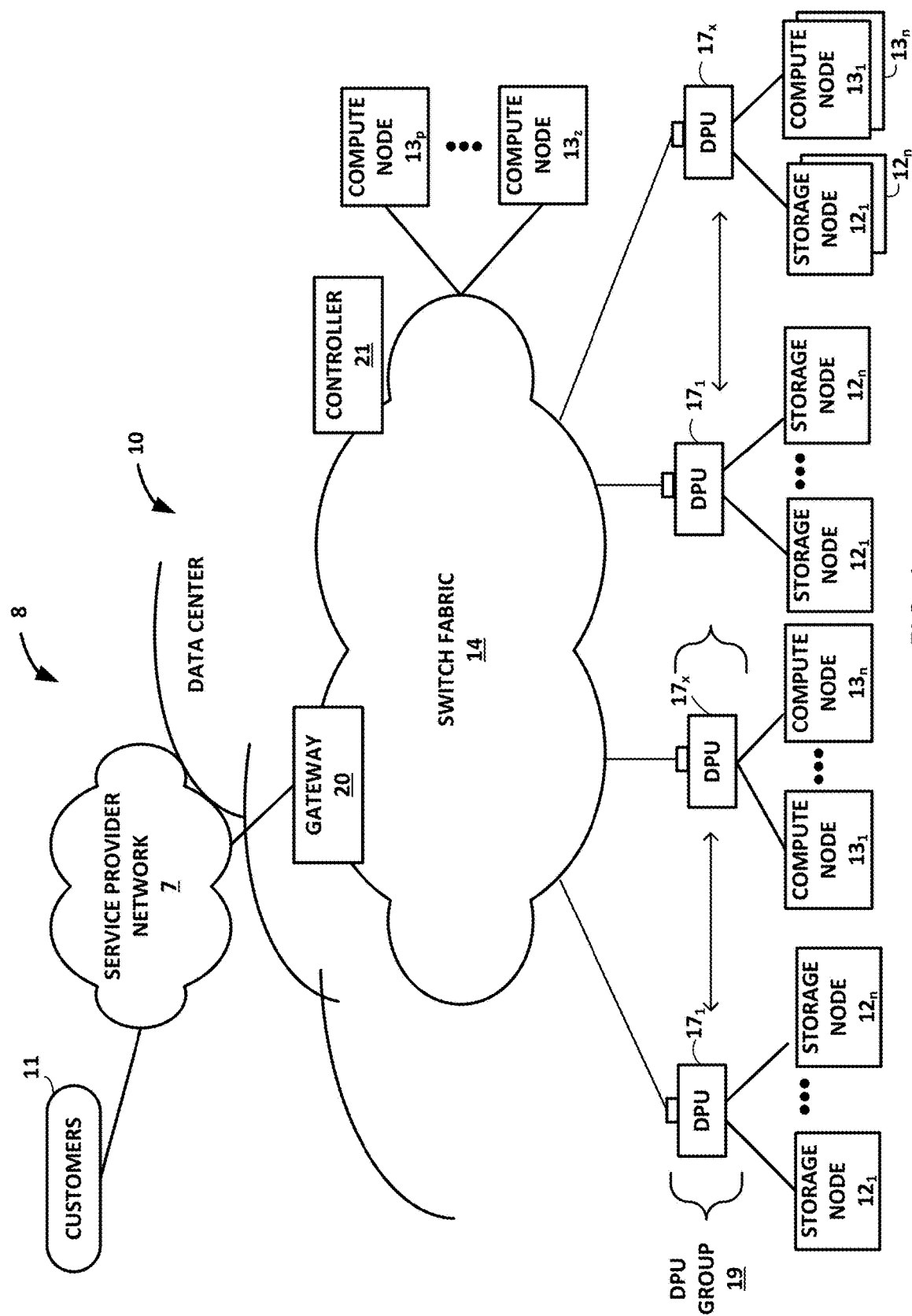
FIG. 1 is a block diagram illustrating an example network having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage nodes 12 and compute nodes 13 interconnected via a high-speed switch fabric 14. In some examples, storage nodes 12 and compute nodes 13 are arranged into multiple different groups, each including any number of nodes up to, for example, n storage nodes $12_1$-$12_n$ and n compute nodes $13_1$-$13_n$ (collectively, "storage nodes 12" and "compute nodes 13"). Although shown as connecting via data processing units (DPUs) 17, data center 10 may include compute nodes $13_p$-$17_z$ coupled directed to switch fabric 14, where such compute nodes $13_p$-$13_z$ may act as the requesting node as described in more detail below. As such, compute nodes 13 may also include compute nodes $13_p$-$17_z$. Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator. In some examples, SDN controller 21 operates to configure data processing units (DPUs) 17 to logically establish one or more virtual fabrics as overlay networks dynamically configured on top of the physical underlay network provided by switch fabric 14. For example, SDN controller 21 may learn and maintain knowledge of DPUs 17 and establish a communication control channel with each of DPUs 17. SDN controller 21 uses its knowledge of DPUs 17 to define multiple sets (groups) of two of more DPUs 17 to establish different virtual fabrics over switch fabric 14. More specifically, SDN controller 21 may use the communication control channels to notify each of DPUs 17 for a given set which other DPUs 17 are included in the same set.

In response, DPUs 17 dynamically setup FCP tunnels with the other DPUs included in the same set as a virtual fabric over packet switched network 410. In this way, SDN controller 21 defines the sets of DPUs 17 for each of the virtual fabrics, and the DPUs are responsible for establishing the virtual fabrics. As such, underlay components of switch fabric 14 may be unaware of virtual fabrics. In these examples, DPUs 17 interface with and utilize switch fabric 14 so as to provide full mesh (any-to-any) interconnectivity between DPUs of any given virtual fabric. In this way, the servers connected to any of the DPUs forming a given one of virtual fabrics may communicate packet data for a given packet flow to any other of the servers coupled to the DPUs for that virtual fabric using any of a number of parallel data paths within switch fabric 14 that interconnect the DPUs of that virtual fabric. More details of DPUs operating to spray packets within and across virtual overlay networks are available in U.S. Provisional Patent Application No. 62/638,788, filed Mar. 5, 2018, entitled "NETWORK DPU VIRTUAL FABRICS CONFIGURED DYNAMICALLY OVER AN UNDERLAY NETWORK" and U.S. patent application Ser. No. 15/939,227, filed Mar. 28, 2018, entitled "NON-BLOCKING ANY-TO-ANY DATA CENTER NETWORK WITH PACKET SPRAYING OVER MULTIPLE ALTERNATE DATA PATHS", the entire contents of each of which are incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of storage nodes 12 and compute nodes 13 is coupled to switch fabric 14 by a DPU 17. As further described herein, in one example, each DPU 17 is a highly programmable I/O processor specially designed for offloading certain functions from storage nodes 12 and compute nodes 13. In one example, each of DPUs 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each DPU 17 includes components for fully implementing and processing network and storage stacks on behalf of one or more storage nodes 12 or compute nodes 13.

In addition, DPUs 17 may be programmatically configured to serve as a security gateway for its respective storage nodes 12 or compute nodes 13, freeing up the processors of the servers to dedicate resources to application workloads. In some example implementations, each DPU 17 may be viewed as a network interface subsystem that implements full offload of the handling of data packets (with zero copy in server memory) and storage acceleration for the attached server systems.

In one example, each DPU 17 may be implemented as one or more application-specific integrated circuit (ASIC) or other hardware and software components, each supporting a subset of the servers. DPUs 17 may also be referred to as access nodes, or devices including access nodes. In other words, the term access node may be used herein interchangeably with the term DPU. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference In example implementations, DPUs 17 are configurable to operate in a standalone network appliance having one or more DPUs. For example, DPUs 17 may be arranged into multiple different DPU groups 19, each including any number of DPUs up to, for example, x DPUs $17_1$-$17_x$. As such, multiple DPUs 17 may be grouped (e.g., within a single electronic device or network appliance), referred to herein as a DPU group 19, for providing services to a group of servers supported by the set of DPUs internal to the device. In one example, a DPU group 19 may comprise four DPUs 17, each supporting four servers so as to support a group of sixteen servers.

In the example of FIG. 1, each DPU 17 provides connectivity to switch fabric 14 for a different group of storage nodes 12 or compute nodes 13 and may be assigned respective IP addresses and provide routing operations for the storage nodes 12 or compute nodes 13 coupled thereto. As described herein, DPUs 17 provide routing and/or switching functions for communications from/directed to the individual storage nodes 12 or compute nodes 13. For example, as shown in FIG. 1, each DPU 17 includes a set of edge-facing electrical or optical local bus interfaces for communicating with a respective group of storage nodes 12 or compute nodes 13 and one or more core-facing electrical or optical interfaces for communicating with core switches within switch fabric 14.

In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the servers. Although not shown in FIG. 1, DPUs 17 may be directly coupled to each other, such as direct coupling between DPUs in a common DPU group 19, to provide direct interconnectivity between the DPUs of the same group. For example, multiple DPUs 17 (e.g., 4 DPUs) may be positioned within a common DPU group 19 for servicing a group of servers (e.g., 16 servers).

As one example, each DPU group 19 of multiple DPUs 17 may be configured as standalone network device, and may be implemented as a two rack unit (2RU) device that occupies two rack units (e.g., slots) of an equipment rack. In another example, DPU 17 may be integrated within a server, such as a single 1RU server in which four CPUs are coupled to the forwarding ASICs described herein on a mother board deployed within a common computing device. In yet another example, one or more of DPUs 17, storage nodes 12, and compute nodes 13 may be integrated in a suitable size (e.g., 10RU) frame that may, in such an example, become a network storage compute unit (NSCU) for data center 10. For example, a DPU 17 may be integrated within a mother board of a storage node 12 or a compute node 13 or otherwise co-located with a server in a single chassis.

In some example implementations, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

In this way, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

As described herein, a data transmission protocol referred to as a Fabric Control Protocol (FCP) may be used by the different operational networking components of any of DPUs 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion.

In general, FCP enables spray of packets of a flow to all paths between a source and a destination node, and may provide numerous advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

The use of FCP may provide certain advantages. For example, the use of FCP may increase significantly the bandwidth utilization of the underlying switch fabric 14. Moreover, in example implementations described herein, the servers of the data center may have full mesh interconnectivity and may nevertheless be non-blocking and drop-free.

Although DPUs 17 are described in FIG. 1 with respect to switch fabric 14 of data center 10, in other examples, DPUs may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the DPUs. The packet switched network may use any technology, including IP over Ethernet as well as other technologies. Irrespective of the type of packet switched network, DPUs may spray individual packets for packet flows between the DPUs and across multiple parallel data paths in the packet switched network and reorder the packets for delivery to the destinations so as to provide full mesh connectivity.

Any of the foregoing aspects of data center 10 may employ file systems that require the processors to manage storage of the data, managing the reads, modifies, and writes of data to the file system through various operating system level interrupts and exceptions. In the context of a large-scale data center, operations to manage file systems and the storage, modification, and retrieval of data therefrom may consume significant portions of the processing cycles available to the processors (and other resources, such as control bus bandwidth, memory, etc.).

Management of the file system may effectively limit the growth (in terms of size) of the file system (as the processors can only dedicate so many processing cycles to file system management), preventing the file system from scaling and thereby limiting data centers from handling new contexts that involve widespread frequent data collection.

A file system may refer to controls and/or other constructs that define how data is stored to and retrieved from storage nodes 12. Different operating systems may utilize different file systems. For example, the Linux™ operating system may support the ext* (e.g., ext2, ext3, and ext4), XFS, journaled file system (JFS), and btrfs. Apple's macOS™ may support the Apple file system (AFS). Microsoft Windows™ operating system may support the file allocation table (FAT), NTFS, exFAT, live file system (LFS), and ReFS. More generally, many of, if not most of, the foregoing file systems conform to a portable operating system interface (POSIX) set of standards promulgated by the IEEE Std. 1003.1-1998.

Many of the foregoing file systems suffer in terms of scalability and are ill-equipped to handle large scale storage and retrieval of data in a highly parallel architecture such as that provided by DPUs 17. Some more recent file systems, such as the Hadoop distributed file system (HDFS), a network file system (NFS), a Lustre file system, and Ceph file system attempt to develop ways by which to scale to accommodate large amounts of data storage, but may not address ways of scaling to accommodate the increasing speed with which data is generated, stored, and accessed in a highly parallel architecture, such as that provided by DPUs 17, and the packet spray enabled thereby, which is further accelerating due to NVME level storage performance and high speed networking (e.g., 100 gigabits per second per server).

In accordance with the techniques of the disclosure, DPUs 17, acting as a backend storage system in combination with storage nodes 17, may implement a scale-out file system capable of scaling both in terms of an amount of data stored and in terms of accommodating highly parallel (and potentially concurrent) access of data by multiple DPUs 17. While various file systems utilize objects as the underlying way by which to store the data (where contiguous blocks of related data may also be referred to as files) and thereby enable scalability in terms of an amount of data stored, the techniques may enable DPUs 17 to present a file system that includes objects that incorporate additional extended functionality as a way to offload processor cycles from requesting ones of DPUs 17 to services ones of DPUs 17, thereby enabling scalability in terms of both the amount of data stored and in terms of supporting highly parallel access of data.

In operation, DPUs 17 may receive a plurality of client operations to perform with respect to the objects identified by the client operations. Compute nodes 13 may originate the various client operations, sending the client operations to one of DPUs 17, which may forward the various client operations to DPUs 17 that are responsible for (or, in other words, own or manage) the objects identified by the client operations (or service the client operations when the objects identified by the client operations are owned by the one of the DPUs 17). In some examples, customers 11 and/or service provider network 7 may originate the various client operations, sending the client operations to one of DPUs 17, which may forward the various client operations to DPUs 17 that are responsible for (or, in other words, own or manage) the objects identified by the client operations (or service the client operations when the objects identified by the client operations are owned by the one of the DPUs 17).

Although described throughout this disclosure as the DPUs 17 acting as the requesting nodes in terms of forwarding client operations, compute nodes $13_p$-$13_z$ may directly issue the client operations to switch fabric 14 without interacting with DPUs 17. Accordingly, while described throughout this disclosure as the DPUs 17 acting as the requesting nodes, compute nodes 13 and/or storage nodes 12 (although not illustrated in the example of FIG. 1 for ease of illustration purposes) may directly interface with switch fabric 14 and issue client operations consistent with various aspects of the techniques described in this disclosure.

One or more DPUs 17 (as there may be high availability) may own the underlying objects stored to storage nodes 12. Furthermore, DPUs 17, as part of presenting the file system, may store the objects in a hierarchical manner that allows for different hierarchies of objects. DPUs 17 may maintain, locally, within each of DPUs 17 the hierarchy of objects, which each of DPUs 17 may discover over time as the hierarchy is traversed. In any event, one such object in the hierarchy (a so-called directory object) may identify the owner or manager (which, again, is one or more of DPUs 17). DPUs 17 may then transmit (possibly via switch fabric 14) the client operations to the managing DPU, which may receive and then process the client operations.

DPUs 17 may each process the client operations for the respective objects for which each of DPUs 17 are listed as an owner (or, in other words, manager). To process the client operations, DPUs 17 identify an object type associated with each of the identified objects. That is, objects may correspond to one of a number of different object types, each of which may be associated with a different set (which should be understood to refer to a non-zero set, and not the mathematical definition of sets that includes non-zero sets) of backend operators.

As such, the objects may differ from objects associated with other object-based file systems in that the objects include integrated operators that may relieve non-managing DPUs 17 (such as those that originate the client instructions) from reserving processor cycles (and other resources, such as memory, memory bandwidth, bus bandwidth, etc.) in an effort to ensure compliance with standards, such as the above noted POSIX, or otherwise ensure file system integrity (e.g., structural integrity and/or semantic integrity) using read/write atomicity, locks (which may also refer to tokens), and other mechanisms. Offloading managing of file system integrity may be restated as distributed management of file system integrity as each managing or owner DPU may perform some portion of file system integrity with respect to those objects for which the owner DPUs are responsible or managing, thereby potentially alleviating or at least reducing the extent of the bottleneck.

DPUs 17 may then each select, based on the object type, one or more backend operators that implement the plurality of client operations. DPUs 17 may each serialize the backend operators associated with each of the respective owned objects to obtain respective serialized backend operators (which may be referred as a serialized backend operator subset from the perspective of each DPU that are applied to an owned object subset). DPUs 17 may serialize the backend operators in an effort to identify when locks are to be used to ensure that multiple writes to the same object do not occur out of order such that data integrity is compromised.

That each owner DPU 17 individual manages locks rather than the requesting DPUs 17 that issued the client operations is one example of offloading of client processing that may otherwise occur in the example file systems listed above. Further, serialization as discussed herein may promote atomicity and thereby potentially ensure data integrity, while also reducing unnecessary locking of objects (or portions thereof) to further tolerate highly-parallel access to objects.

DPUs 17 may next apply the serialized backend operators to the identified objects. Each of DPUs 17 may apply the respective subset of the serialized backend operators to the subset of the identified objects for which each of DPUs 17 is responsible (or, in other words, manage or own). The backend operators may differ from the client instructions. Although described in more detail below, to illustrate, consider that a DPU 17 may issue a client instruction in accordance with a client application programming interface (API), which represents an interface presented by the underlying operating system that enables interactions with the file system. The client API may define client operations, such as create, write, read, lookup, link, and unlink.

One or more of the backend operators may implement the foregoing client operations, where the various backend operators may differ based on the type of object. For example, DPU 17 may associate the above noted directory object with backend operators, such as a lookup, add, delete, list, and rename. As described in more detail below, various other types of objects (such as an index node—Inode—object, data object, and superblock object) may be associated with different backend operators.

In this respect, the techniques may enable DPUs 17 to implement a distributed file system that facilitates scale out in at least two dimensions (e.g., in terms of the amount of data capable of being stored to the file system, and the number of concurrent—or in other words, parallel—access to the file system. The techniques may distribute operations within the file system to permit highly parallel access to the underlying objects through use of what may be referred to as "smart objects." Smart objects may refer to objects for which there are associated functions that differ based on the type of the corresponding object. A smart object may, in this respect, implement operations that operate on the state of an object in a potentially atomic and/or efficient manner.

Rather than resort to the requesting DPU managing the underlying operations required to access the file system (e.g., managing locks and serialization, and other operations), the techniques may distribute the underlying operations required to access the file system to DPUs responsible for owning or managing the objects to which such operations are to be applied. In this way, the techniques may distribute the tree (representative of the file system) over multiple DPUs 17. Further, the ownership aspect of the techniques may allow DPUs to serialize execution of the operations so as to potentially reduce a number of locks required to access the data and thereby potentially increase availability of object access in a manner the promotes highly parallel access.

Figure 2:
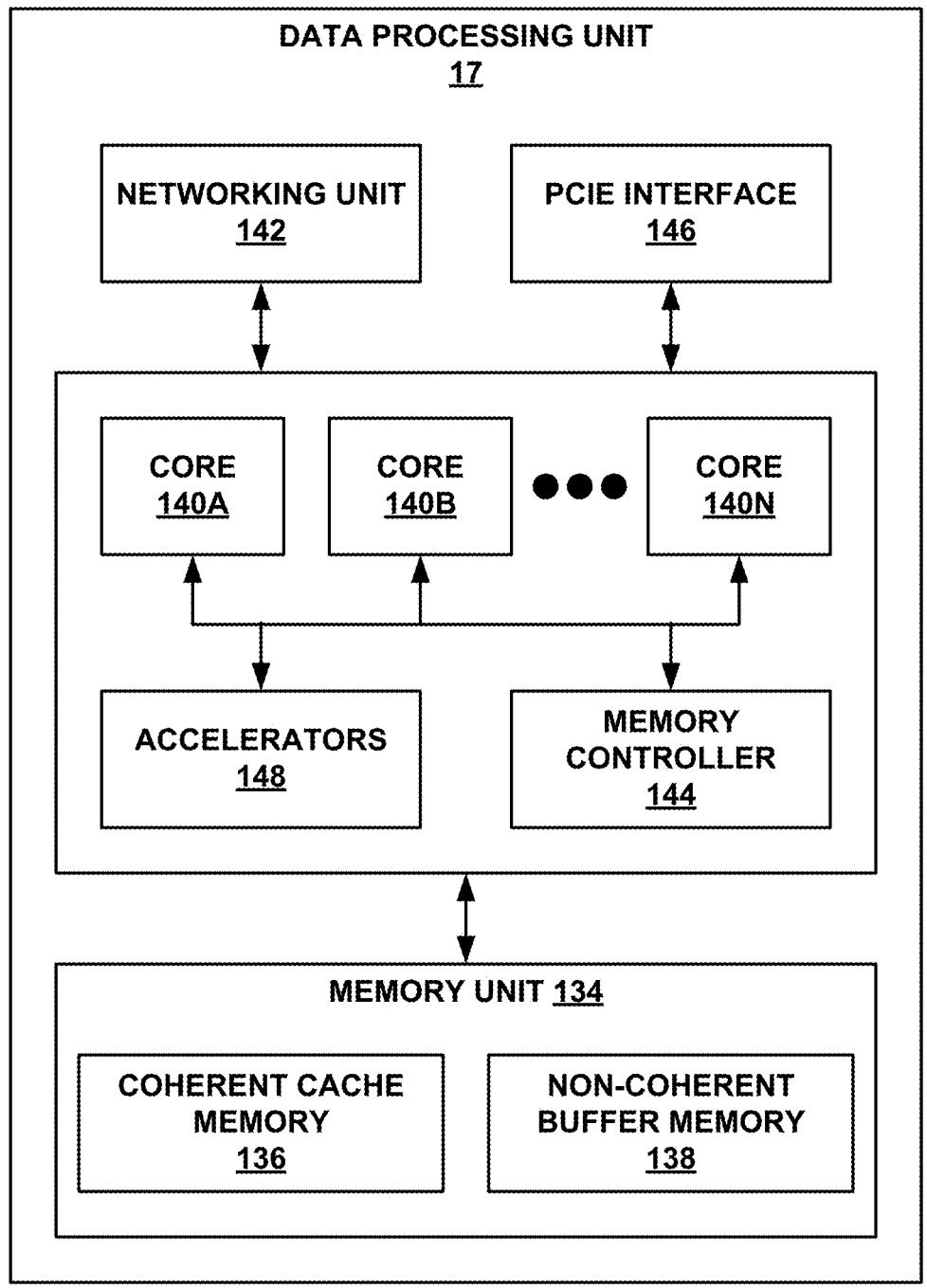
FIG. 2 is a block diagram illustrating an example data processing unit (DPU) of FIG. 1 in further detail.

FIG. 2 is a block diagram illustrating an example DPU 17 of FIG. 1 in further detail. DPU 17 generally represents a hardware chip implemented in digital logic circuitry. DPU 17 may operate substantially similar to any of DPUs $17_1$-$17_N$ of FIG. 1. Thus, DPU 17 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 2, DPU 17 includes a plurality of programmable processing cores 140A-140N ("cores 140") and a memory unit 134. Memory unit 134 may include two types of memory or memory devices, namely coherent cache memory 136 and non-coherent buffer memory 138. In some examples, plurality of cores 140 may include at least two processing cores. In one specific example, plurality of cores 140 may include six processing cores. DPU 17 also includes a networking unit 142, one or more PCIe interfaces 146, a memory controller 144, and one or more accelerators 148. As illustrated in FIG. 2, each of cores 140, networking unit 142, memory controller 144, PCIe interfaces 146, accelerators 148, and memory unit 134 including coherent cache memory 136 and non-coherent buffer memory 138 are communicatively coupled to each other.

In this example, DPU 17 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC—performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, the new processing architecture utilizing a DPU may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142 and/or PCIe interfaces 146, in a sequential manner using one or more "work units." In general, work units are sets of data exchanged between cores 140 and networking unit 142 and/or PCIe interfaces 146 where each work unit may represent one or more of the events related to a given data packet of a stream. As one example, a Work Unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores of a DPU may be configured to execute program instructions using a work unit (WU) stack.

In some examples, in processing the plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

DPU 17 may act as a combination of a switch/router and a number of network interface cards. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as network 7 of FIG. 1. In this way, DPU 17 supports one or more high-speed network interfaces, e.g., Ethernet ports, without the need for a separate network interface card (NIC). Each of PCIe interfaces 146 may support one or more PCIe interfaces, e.g., PCIe ports, for connectivity to an application processor (e.g., an x86 processor of a server device or a local CPU or GPU of the device hosting DPU 17) or a storage device (e.g., an SSD). DPU 17 may also include one or more high bandwidth interfaces for connectivity to off-chip external memory (not illustrated in FIG. 2). Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like.

Memory controller 144 may control access to memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. In some examples, memory controller 144 may map the accesses based on one or more of an address range, an instruction or an operation code within the instruction, a special access, or a combination thereof.

Additional details regarding the operation and advantages of the DPU are available in U.S. patent application Ser. No. 16/031,921, filed Jul. 10, 2018, and titled "DATA PROCESSING UNIT FOR COMPUTE NODES AND STORAGE NODES," and U.S. patent application Ser. No. 16/031, 676, filed Jul. 10, 2018, and titled "ACCESS NODE FOR DATA CENTERS", the entire content of each of which is incorporated herein by reference.

Each of cores 140 may represent one or more processors configured to perform various aspects of the scaled-out filesystem techniques described in this disclosure. One or more of cores 140 may receive a plurality of client operations to perform with respect to the objects identified by the client operations. Compute nodes 13 (shown in the example of FIG. 1) may originate the various client operations, sending the client operations to one of DPUs 17, where cores 140 may identify one of DPUs 17 that are responsible for (or, in other words, own or manage) the objects identified by the client operations (or service the client operations when the objects identified by the client operations are owned by the one of the DPUs 17). When the identified DPU 17 is not the DPU that received the client operations, cores 140 may forward the client operations to the responsible one of the DPUs 17. When the identified DPU 17 is the DPU that received the client operations, cores 140 may process the client operations in the manner described below.

In any event, cores 140 may process the client operations for the respective objects for which DPU 17 is listed as an owner (or, in other words, manager). To process the client operations, cores 140 may identify an object type associated with each of the identified objects.

Cores 140 may then select, based on the object type, one or more backend operators that implement the plurality of client operations. Cores 140 may serialize the backend operators associated with each of the respective owned objects to obtain respective serialized backend operators (which may be referred as a serialized backend operator subset from the perspective of each DPU that are applied to an owned object subset). Cores 140 may serialize the backend operators in an effort to identify when locks are to be used to ensure that multiple writes to the same object do not occur out of order such that data integrity is compromised. Cores 140 may next apply the serialized backend operators to the identified objects.

Figure 3:
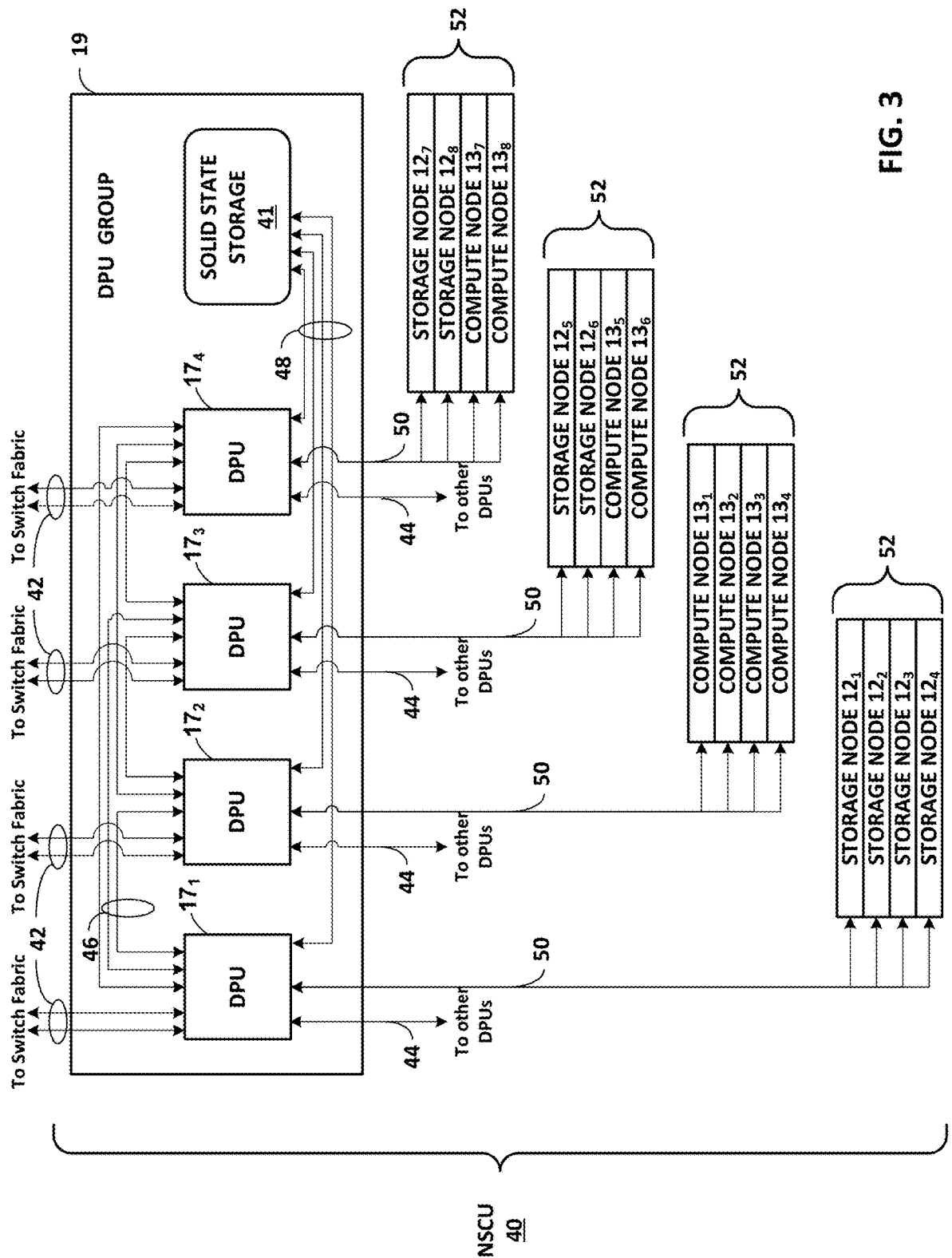
FIG. 3 is a block diagram illustrating one example of network storage compute unit (NSCU) 40 including a DPU and its supported storage and compute nodes.

FIG. 3 is a block diagram illustrating one example of network storage compute unit (NSCU) 40 including a DPU group 19 and its supported node group 52. DPU group 19 may be configured to operate as a high-performance I/O hub designed to aggregate and process network and storage I/O to multiple node groups 52. In the particular example of FIG. 3, DPU group 19 includes four DPUs 17$_1$-17$_4$ (collectively, "DPUs 17") connected to a pool of local solid state storage 41. In the illustrated example, DPU group 19 supports a total of eight storage nodes 12$_1$-12$_8$ (collectively, "storage nodes 12") and eight compute nodes 13$_1$-13$_8$ (collectively, compute nodes 13) with each of the four DPUs 17 within DPU group 19 supporting four of storage nodes 12 and compute nodes 13. In some examples, each of the four storage nodes 12 and/or compute nodes 13 supported by each of the DPUs 17 may be arranged as a node group 52. In some examples, the "storage nodes 12" or "compute nodes 13" described throughout this application may be dual-socket or dual-processor "storage nodes" or "compute nodes" that are arranged in groups of two or more within a standalone device, e.g., node group 52. In the example of FIG. 3, a DPU supports four nodes of storage nodes 12 and/or compute nodes 13. The 4 nodes may be any combination of storage nodes 12 and/or compute nodes 13 (e.g., 4 storage nodes 12 and 0 compute nodes 13, 2 storage nodes 12 and 2 compute nodes 13, 1 storage node 12 and 3 compute nodes 13, 0 storage nodes 12 and 4 compute nodes 13, etc.).

Although DPU group 19 is illustrated in FIG. 3 as including four DPUs 17 that are all connected to a single pool of solid state storage 41, a DPU group may be arranged in other ways. In one example, each of the four DPUs 17 may be included on an individual DPU sled that also includes solid state storage and/or other types of storage for the DPU. In this example, a DPU group may include four DPU sleds each having a DPU and a set of local storage devices.

In one example implementation, DPUs 17 within DPU group 19 connect to node groups 52 and solid state storage 41 using Peripheral Component Interconnect express (PCIe) links 48, 50, and connect to other DPUs and the datacenter switch fabric 14 using Ethernet links 42, 44, 46. For example, each of DPUs 17 may support six high-speed Ethernet connections, including two externally-available Ethernet connections 42 for communicating with the switch fabric, one externally-available Ethernet connection 44 for communicating with other DPUs in other DPU groups, and three internal Ethernet connections 46 for communicating with other DPUs 17 in the same DPU group 19. In one example, each of externally-available connections 42 may be a 100 Gigabit Ethernet (GE) connection. In this example, DPU group 19 has 8×100 GE externally-available ports to connect to the switch fabric 14.

Within DPU group 19, connections 42 may be copper, i.e., electrical, links arranged as 8×25 GE links between each of DPUs 17 and optical ports of DPU group 19. Between DPU group 19 and the switch fabric, connections 42 may be optical Ethernet connections coupled to the optical ports of DPU group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to DPU group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of DPUs 17 include one Ethernet connection 44 for communication with other DPUs within other DPU groups, and three Ethernet connections 46 for communication with the other three DPUs within the same DPU group 19. In some examples, connections 44 may be referred to as "inter-DPU group links" and connections 46 may be referred to as "intra-DPU group links."

Ethernet connections 44, 46 provide full-mesh connectivity between DPUs within a given structural unit. In one example, such a structural unit may be referred to herein as a logical rack (e.g., a half-rack or a half physical rack) that includes two NSCUs 40 having two AGNs 19 and supports an 8-way mesh of eight DPUs 17 for those AGNs. In this particular example, connections 46 would provide full-mesh connectivity between the four DPUs 17 within the same DPU group 19, and connections 44 would provide full-mesh connectivity between each of DPUs 17 and four other DPUs within one other DPU group of the logical rack (i.e., structural unit). In addition, DPU group 19 may have enough, e.g., sixteen, externally-available Ethernet ports to connect to the four DPUs in the other DPU group.

In the case of an 8-way mesh of DPUs, i.e., a logical rack of two NSCUs 40, each of DPUs 17 may be connected to each of the other seven DPUs by a 50 GE connection. For example, each of connections 46 between the four DPUs 17 within the same DPU group 19 may be a 50 GE connection arranged as 2×25 GE links. Each of connections 44 between the four DPUs 17 and the four DPUs in the other DPU group may include four 50 GE links. In some examples, each of the four 50 GE links may be arranged as 2×25 GE links such that each of connections 44 includes 8×25 GE links to the other DPUs in the other DPU group.

In another example, Ethernet connections 44, 46 provide full-mesh connectivity between DPUs within a given structural unit that is a full-rack or a full physical rack that includes four NSCUs 40 having four AGNs 19 and supports a 16-way mesh of DPUs 17 for those AGNs. In this example, connections 46 provide full-mesh connectivity between the four DPUs 17 within the same DPU group 19, and connections 44 provide full-mesh connectivity between each of DPUs 17 and twelve other DPUs within three other DPU group. In addition, DPU group 19 may have enough, e.g., forty-eight, externally-available Ethernet ports to connect to the four DPUs in the other DPU group.

In the case of a 16-way mesh of DPUs, each of DPUs 17 may be connected to each of the other fifteen DPUs by a 25 GE connection, for example. In other words, in this example, each of connections 46 between the four DPUs 17 within the same DPU group 19 may be a single 25 GE link. Each of connections 44 between the four DPUs 17 and the twelve other DPUs in the three other DPU groups may include 12×25 GE links.

As shown in FIG. 3, each of DPUs 17 within a DPU group 19 may also support a set of high-speed PCIe connections 48, 50, e.g., PCIe Gen 3.0 or PCIe Gen 4.0 connections, for communication with solid state storage 41 within DPU group 19 and communication with node groups 52 within NSCU 40. Each of node groups 52 includes four storage nodes 12 and/or compute nodes 13 supported by one of DPUs 17 within DPU group 19. Solid state storage 41 may be a pool of Non-Volatile Memory express (NVMe)-based solid state drive (SSD) storage devices accessible by each of DPUs 17 via connections 48.

In one example, solid state storage 41 may include twenty-four SSD devices with six SSD devices for each of DPUs 17. The twenty-four SSD devices may be arranged in four rows of six SSD devices with each row of SSD devices being connected to one of DPUs 17. Each of the SSD devices may provide up to 16 Terabytes (TB) of storage for a total of 384 TB per DPU group 19. As described in more detail below, in some cases, a physical rack may include four DPU groups 19 and their supported node groups 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the DPUs 17 is included on an individual DPU sled with local storage for the DPU, each of the DPU sleds may include four SSD devices and some additional storage that may be hard drive or solid state drive devices. In this example, the four SSD devices and the additional storage may provide approximately the same amount of storage per DPU as the six SSD devices described in the previous example.

In one example, each of DPUs 17 supports a total of 96 PCIe lanes. In this example, each of connections 48 may be an 8×4-lane PCI Gen 3.0 connection via which each of DPUs 17 may communicate with up to eight SSD devices within solid state storage 41. In addition, each of connections 50 between a given DPU 17 and the four storage nodes 12 and/or compute nodes 13 within the node group 52 supported by the DPU 17 may be a 4×16-lane PCIe Gen 3.0 connection. In this example, DPU group 19 has a total of 256 external facing PCIe links that interface with node groups 52. In some scenarios, DPUs 17 may support redundant server connectivity such that each of DPUs 17 connects to eight storage nodes 12 and/or compute nodes 13 within two different node groups 52 using an 8×8-lane PCIe Gen 3.0 connection.

In another example, each of DPUs 17 supports a total of 64 PCIe lanes. In this example, each of connections 48 may be an 8×4-lane PCI Gen 3.0 connection via which each of DPUs 17 may communicate with up to eight SSD devices within solid state storage 41. In addition, each of connections 50 between a given DPU 17 and the four storage nodes 12 and/or compute nodes 13 within the node group 52 supported by the DPU 17 may be a 4×8-lane PCIe Gen 4.0 connection. In this example, DPU group 19 has a total of 128 external facing PCIe links that interface with node groups 52.

DPUs 17 may perform various aspects of the techniques described in this disclosure to implement the scale-out file system. For example, DPU $17_2$ may receive client operations from compute nodes 13. DPU $17_2$ may access a local representation of the file system to identify which of DPUs 17 are responsible for the objects referenced by the client operations. Assuming for purposes of illustration that DPU $17_1$ is responsible for the objects referenced by the client operations, DPU $17_2$ may forward the client operations to DPU $17_1$. DPU $17_1$ may then process the client operations in the manner described herein in more detail to perform the requested operations.

Figure 4:
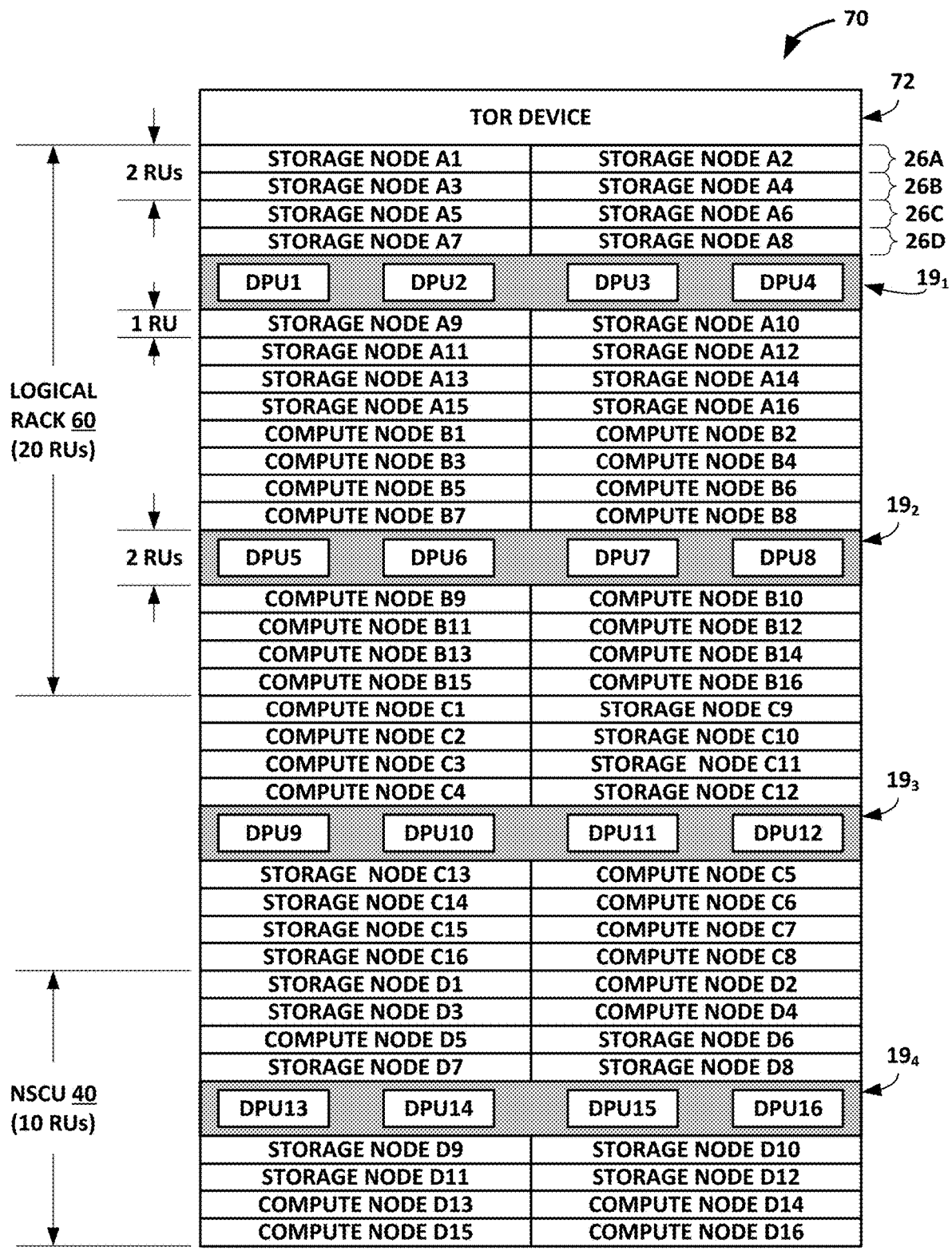
FIG. 4 is a block diagram illustrating an example arrangement of a full physical rack in which examples of the techniques described herein may be implemented.

FIG. 4 is a block diagram illustrating an example arrangement of a full physical rack 70 including two logical racks 60. In the illustrated example of FIG. 4, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor described in further detail below. In some examples, rack 70 may not include an additional TOR device 72 and instead have the typical 40 rack units.

In the illustrated example, rack 70 includes four DPU groups $19_1$-$19_4$ that are each separate network appliances 2RU in height. Each of the DPU groups 19 includes four DPUs and may be configured as shown in the example of FIG. 3. For example, DPU group $19_1$ includes DPUs DPU1-DPU4, DPU group $19_2$ includes DPUs DPU5-DPU8, DPU group $19_3$ includes DPUs DPU9-DPU12, and DPU group $19_4$ includes DPUs DPU13-DPU16. DPUs DPU1-DPU16 may be substantially similar to DPUs 17 described above.

Further, rack 70 includes a plurality of storage trays 26. Each storage tray 26 includes an electrical backplane configured to provide an interface between DPU 17 and one or more storage nodes 12 and compute nodes 13. Further, each storage tray 26 may provide power and physical support to one or more storage nodes 12 and compute nodes 13.

In this example, each of the DPU groups 19 supports sixteen storage nodes and/or compute nodes. For example, DPU group $19_1$ supports storage nodes A1-A16, DPU group $19_2$ supports compute nodes B1-B16, DPU group $19_3$ supports compute nodes C1-C8 and storage nodes C9-C16, and DPU group $19_4$ supports storage nodes D1, D3, D6-D12 and compute nodes D2, D4, D5, and D13-D16. Each storage node or compute node may be a dual-socket or dual-processor server sled that is ½Rack in width and 1RU in height. In some examples, four of the storage nodes or compute nodes may be arranged into a node group 52 that is 2RU in height. For example, node group 52A includes storage nodes A1-A4, node group 52B includes storage nodes A5-A8, node group 52C includes storage nodes A9-A12, and storage group 52D includes storage nodes A13-A16. Nodes B1-B16, C1-C16, and D1-D16 may be similarly arranged into node groups 52.

DPU groups 19 and node groups 52 are arranged into NSCUs 40 from FIGS. 3-4. NSCUs 40 are 10RU in height and each include one 2RU DPU group 19 and four 2RU node groups 52. As illustrated in FIG. 4, DPU groups 19 and node groups 52 may be structured as a compute sandwich, in which each DPU group 19 is "sandwiched" between two node groups 52 on the top and two node groups 52 on the bottom. For example, with respect to DPU group $19_1$, node group 52A may be referred to as a top second server, node group 52B may be referred to as a top server, node group 52C may be referred to as a bottom server, and node group 52D may be referred to as a bottom second server. In the illustrated structural arrangement, DPU groups 19 are separated by eight rack units to accommodate the bottom two 2RU node groups 52 supported by one DPU group and the top two 2RU node groups 52 supported by another DPU group.

NSCUs 40 may be arranged into logical racks 60, i.e., half physical racks. Logical racks 60 are 20RU in height and each include two NSCUs 40 having full mesh connectivity. In the illustrated example of FIG. 4, DPU group $19_1$ and DPU group $19_2$ are included in the same logical rack 60 along with their respective supported storage and compute nodes A1-A16 and B1-B16. In some examples, DPUs DPU1-DPU8 included the same logical rack 60 are connected to each other in an 8-way mesh. DPUs DPU9-DPU16 may be similarly connected in an 8-way mesh within another logical rack 60 includes DPUs groups $19_3$ and $19_4$ along with their respective storage and compute nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between DPUs 17 and core switches 22 and that is configured such that optical communications are "permuted" based on wavelength so as to provide full-mesh connectivity between the upstream and downstream ports without any optical interference.

In the illustrated example, each of the DPU groups 19 may connect to TOR device 72 via one or more of the 8×100 GE links supported by the DPU group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 may not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four storage nodes and compute nodes and the four DPU groups. For example, each of the DPU groups 19 may use approximately 1 kW of power resulting in approximately 4 kW of power for DPU groups. In addition, each of the storage nodes and compute nodes may use approximately 200 W of power resulting in around 12.8 kW of power for node groups 52. In this example, the 40RU arrangement of DPU groups 19 and node groups 52, therefore, uses around 16.8 kW of power.

As described herein, DPUs 17 may perform various aspects of the techniques described in this disclosure to implement the scale-out file system. For example, DPU5 may receive client operations from compute nodes B9. DPU5 may access a local representation of the file system to identify which of DPUs 17 are responsible for the objects referenced by the client operations. Assuming for purposes of illustration that DPU6 is responsible for the objects referenced by the client operations, DPU5 may forward the client operations to DPU6. DPU6 may then process the client operations in the manner described herein in more detail to perform the requested operations.

Figure 5:
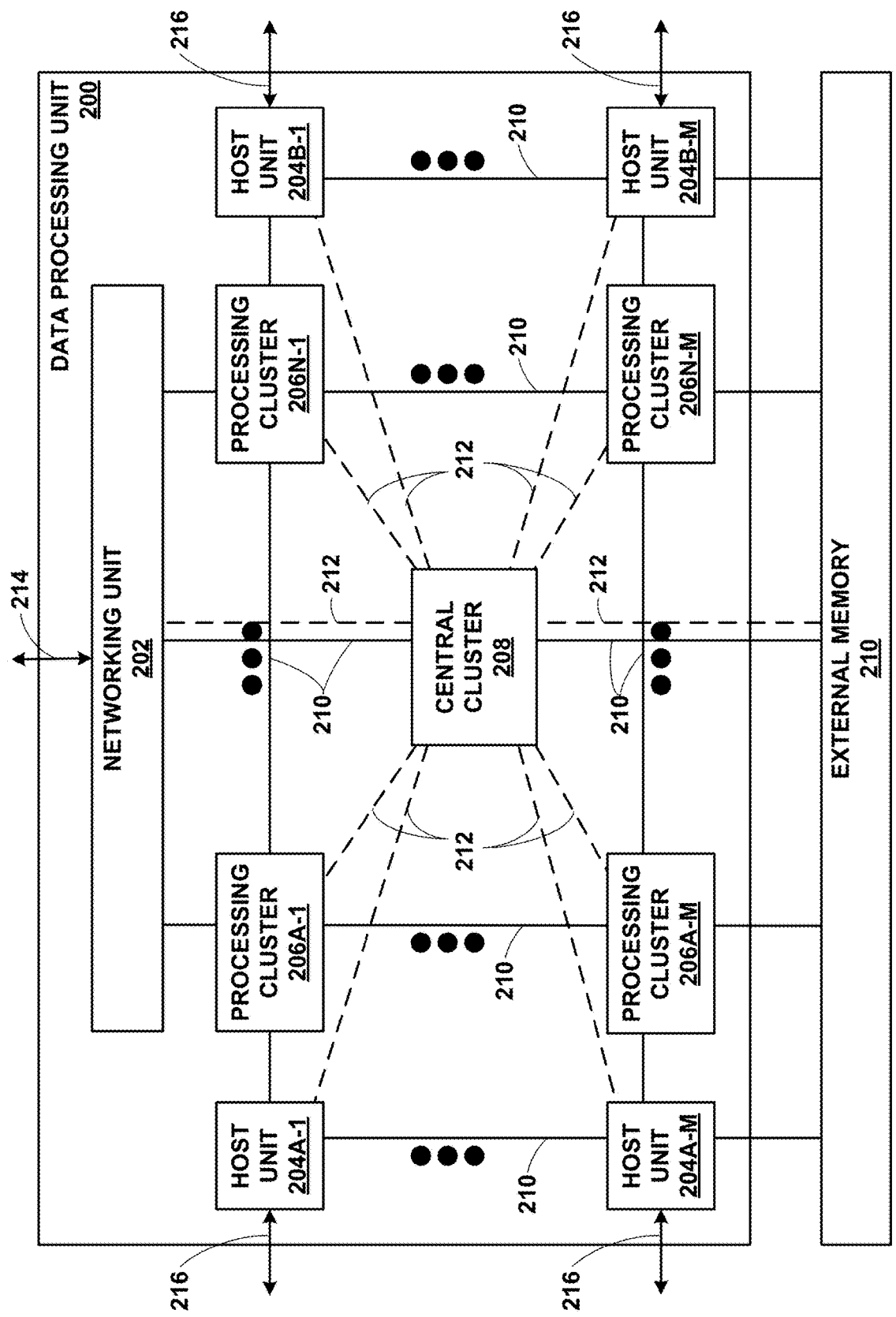
FIG. 5 is a block diagram illustrating one example of a data processing unit including a networking unit, at least one host unit, and two or more processing clusters.

FIG. 5 is a block diagram illustrating one example of a data processing unit 200 including a networking unit, at least one host unit, and two or more processing clusters. Data processing unit 200 may operate substantially similar to any of DPUs 17 of FIG. 1. Thus, data processing unit 200 may be communicatively coupled to a data center fabric (e.g., switch fabric 14), one or more server devices (e.g., storage nodes 12 and/or compute nodes 13), storage media, one or more network devices, random access memory, or the like, e.g., via PCI-e, Ethernet (wired or wireless), or other such communication media in order to interconnect each of these various elements. Data processing unit 200 generally represents a hardware chip implemented in digital logic circuitry. As various examples, data processing unit 200 may be provided as an integrated circuit mounted on a motherboard of a computing device or installed on a card connected to the motherboard of the computing device.

In general, data processing unit 200 represents a high performance, hyper-converged network, storage, and data processor and input/output hub. As illustrated in FIG. 2, data processing unit 200 includes networking unit 202, host units 204A-1-204B-M (host units 204), processing clusters 206A-1-206N-M (processing clusters 206), and central cluster 208, and is coupled to external memory 210. Each of host units 204, processing clusters 206, central cluster 208, and networking unit 202 may include a plurality of processing cores, e.g., MIPS cores, ARM cores, PowerPC cores, RISC-V cores, or CISC or x86 cores. External memory 210 may comprise random access memory (RAM) or dynamic random access memory (DRAM).

As shown in the example of FIG. 5, host units 204, processing clusters 206, central cluster 208, networking unit 202, and external memory 210 are communicatively interconnected via one or more specialized network-on-chip fabrics. A set of direct links 212 (represented as dashed lines in FIG. 5) forms a signaling network fabric that directly connects central cluster 208 to each of the other components of data processing unit 200, that is, host units 204, processing clusters 206, networking unit 202, and external memory 210. A set of grid links 210 (represented as solid lines in FIG. 5) forms a data network fabric that connects neighboring components (including host units 204, processing clusters 206, networking unit 202, and external memory 210) to each other in a two-dimensional grid.

Networking unit 202 may have Ethernet interfaces 214 to connect to the switch fabric, and interfaces to the data network formed by grid links 210 and the signaling network formed by direct links 212. Networking unit 202 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 202, which are coupled to respective grid links 210. The DMA engines of networking unit 202 are configured to fetch packet data for transmission. The packet data may be in on-chip or off-chip buffer memory (e.g., within buffer memory of one of processing clusters 206 or external memory 210), or in host memory.

Host units 204 may each have PCI-e interfaces 216 to connect to servers and/or storage devices, such as SSDs or HDDs. This may allow data processing unit 200 to operate as an endpoint or as a root. For example, data processing unit 200 may connect to a host system (e.g., a server) as an endpoint device, and data processing unit 200 may connect as a root to endpoint devices (e.g., SSD devices). Each of host units 204 may also include a respective hardware direct memory access (DMA) engine (not shown). Each DMA engine is configured to fetch data and buffer descriptors from host memory, and to deliver data and completions to host memory.

Although not shown, each of central cluster 208 and processing clusters 206 may include two or more processing cores and two or more hardware accelerators. In general, hardware accelerators perform acceleration for various data-processing functions, such as look-ups, matrix multiplication, cryptography, compression, regular expressions, or the like. That is, the hardware accelerators may comprise hardware implementations of lookup engines, matrix multipliers, cryptographic engines, compression engines, regular expression interpreters, or the like. The hardware accelerators may also perform acceleration for additional data reduction techniques beyond compression, including erasure coding and, in some cases, deduplication and thin provisioning.

Data processing unit 200 provides optimizations for stream processing. Data processing unit 200 executes an operating system that provides run-to-completion processing, which may eliminate interrupts, thread scheduling, cache thrashing, and associated costs. For example, an operating system may run on one or more of processing clusters 206. Central cluster 208 may be configured differently from processing clusters 206, which may be referred to as stream processing clusters. In general, central cluster 208 executes the operating system kernel (e.g., Linux kernel) as a control plane. Processing clusters 206 may function in run-to-completion thread mode of a data plane software stack of the operating system. That is, processing clusters 206 may operate in a tight loop fed by work unit queues associated with each processing core in a cooperative multi-tasking fashion.

Data processing unit 200 operates on work units. Work units are sets of data exchanged between processing clusters 206, networking unit 202, host units 204, central cluster 208, and external memory 210. Work units may associate a buffer with an instruction stream to eliminate checking overhead and allow processing by reference to minimize data movement and copy. The stream-processing model may structure access by multiple processors (e.g., processing clusters 206) to the same data and resources, avoid simultaneous sharing, and therefore, reduce contention. A processor may relinquish control of data referenced by a work unit as the work unit is passed to the next processor in line. Central cluster 208 may include a central dispatch unit responsible for work unit queuing and flow control, work unit and completion notification dispatch, and load balancing and processor selection from among processing cores of processing clusters 206 and/or central cluster 208. Software that executes on one of processing clusters or central cluster 208 to implement a work unit is referred to herein as a work unit handler (WUH).

More details on work units and stream processing by access nodes are available in U.S. Provisional Patent Application No. 62/589,427, filed Nov. 21, 2017, entitled "Work Unit Stack Data Structures in Multiple Core Processor System,".

One or more of processing clusters 206 of data processing unit 200 may host a data plane for performing data storage operations on a durable block device (DBD) that provides persistent storage of data blocks with inline erasure coding enabled by the hardware accelerators of processing clusters 206. Management and control planes of the DBD may be hosted on one or more servers connected to data processing unit 200 via host units 204 or via networking unit 202.

The data plane of the DBD hosted on the one or more of processing clusters 206 may communicate with the management plane and the control plane via a management agent and a control agent, respectively, hosted on central cluster 208 of data processing unit 200. The data plane of the DBD hosted on the one or more of processing clusters 206 of data processing unit 200 may be divided into multiple layers of functionality from application (e.g., user volume) to device (e.g., SSD storage device). The data plane may include a log structured logical volume layer of the DBD that may enable performance of inline erasure coding.

The data plane of the DBD hosted on the one or more of processing clusters 206 of data processing unit 200 handles the work load of responding to data block read and write requests received via host units 204 from applications running on the servers. For example, when a write request for a hosted volume is received on one of PCI-e interfaces 216 of host units 204 from an application running on one of the servers, the receiving one of host units 204 generates a work unit to one of processing clusters 206. In response to the work unit, the one of processing clusters 206 performs the write request to the appropriate volume hosted by data processing unit 200. To perform the write request, the one of processing clusters 206 may propagate the work unit (or multiple work units) through the multiple functional layers of the storage stack, which may be hosted on a different one of processing clusters 206 of data processing unit 200 or on different access nodes.

The control and management agents running on central cluster 208 of data processing unit 200 facilitate communication between the data plane of the DBD hosted on data processing unit 200 and the control and management planes of the DBD running on the servers. In general, the number of control and management agents is a very small fraction (e.g., 1%) of the number of data plane entities hosted on access nodes. As one example, central cluster 208 of data processing unit 200 may host a single control agent and a single management agent, while processing clusters 206 may host data planes for hundreds of DBD user volumes. Conversely, in other examples, central cluster 208 of data processing unit 200 may host multiple control and management agents as a larger fraction (e.g., 25% or 50%) of the number of data planes hosted on processing clusters 206, or even in a one-to-one relationship between control and management agents and data planes.

Data processing units 17 may store data in and retrieve data from a key-value store. From an API perspective, the key-value store is a type of access method in addition to Block access methods for directly storing and reading blocks of data. Both the key-value store and the Block access methods may be part of a set of control plane commands used to configure storage resources. From an implementation perspective, the key-value store may use devices that use block access methods for storing data objects (e.g., a directory, a large value store, etc.).

In the key-value store, discrete pieces of data (i.e., a value) are associated with corresponding keys. An access node may use the key associated with a value to retrieve the value. In general, a key is an identifier (e.g., number, string of bits, string of alphanumeric values, etc.). In some examples, a key is smaller in size than the value associated with the key. Various types of values may be stored in a key-value store. For examples, the values may include pictures, videos, authentication credentials, webpage data, programming scripts, virtual machine images, documents, or other types of data.

In the example of FIG. 5, DPU 200 may receive the client operations via network packets received by networking unit 202. Networking unit 202 may forward the network packets to central cluster 208, which may either redirect the client operation via networking unit 202 to a responsible one of DPUs 17 or forward the network packets to processing clusters 206 for processing the client operations for objects owned by DPU 200.

Assuming that at least one of the client operations is owned by DPU 200, processing clusters 206 may identify an object type associated with each of the identified objects. Processing clusters 206 may then select, based on the object type, one or more backend operators that implement the plurality of client operations. Processing clusters 206 may serialize the backend operators associated with each of the respective owned objects to obtain respective serialized backend operators (which may be referred as a serialized backend operator subset from the perspective of each DPU that are applied to an owned object subset), as described below in more detail. Processing cluster 206 may apply the serialized backend operators to the identified objects.

The backend operators may result in reads of data, writes of data, or other operations, which may or may not require one or more of processing clusters 206 to issue a response via an application programmers interface (API) to the originator of the client operations. As such, one or more processing clusters 206 may generate a response to the client operations (which may be referred to as a "client operation response"). The client operation response may provide read data to the originator, confirmation of a lock (with an included token), an acknowledgement of a successful write or other operation consistent with file system operation. One or more of processing clusters 206 may transmit the client operation response via networking unit 202 as one or more network packets addressed to the originator of the client operation.

Figure 6:
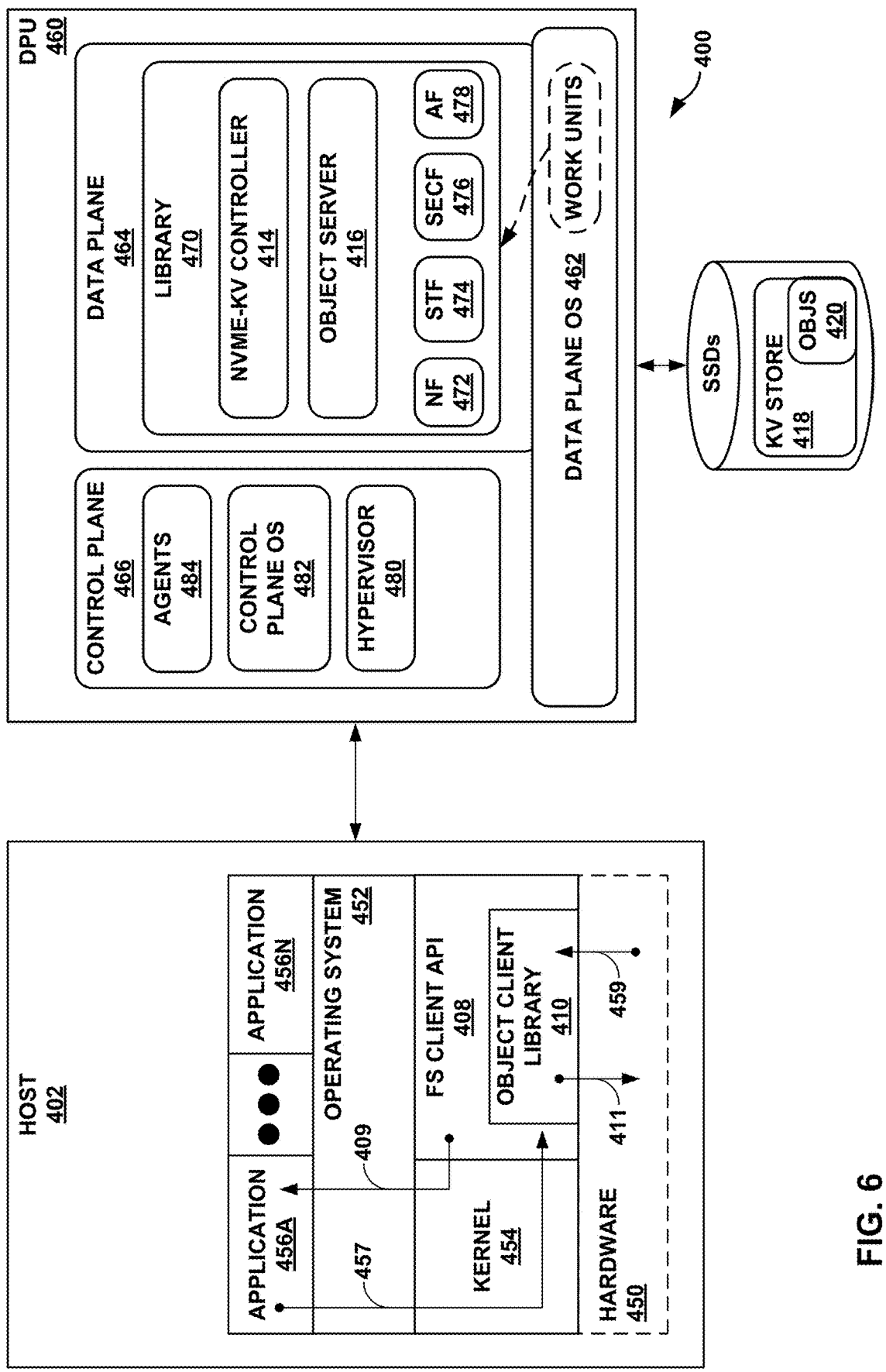
FIG. 6 is a block diagram illustrating an example software architecture of a key-value storage system 300, in accordance with one or more techniques of this disclosure.

FIG. 6 is a block diagram illustrating an example system 400 that may be configured to perform various aspects of the techniques described in this disclosure. As shown in the example of FIG. 6, system 400 includes a host 402 and a data processing unit ("DPU") 460. Host 402 may be similar to, as one examples, computing nodes 13 shown in the example of FIGS. 1, 3, and 4. DPU 460 may implement, in part, key-value storage system 300 shown in the example of FIG. 7.

As further shown in the example of FIG. 6, host 402 includes hardware 450, which may represent one or more processors configured to perform various aspects of the file system techniques described in this disclosure. Hardware 450 may represent any hardware described in this disclosure, including a central processing unit (CPU), a graphics processing unit (GPU), an ASIC, an FPGA, memory (RAM, SRAM, SDRAM or other types of volatile or non-volatile memory), storage devices (including solid state drives—SSDs), memory busses, mother boards, network interface cards (NICs), etc. Hardware 450 is shown as a dashed lined box to denote that such hardware exists below the software abstraction shown in the example FIG. 6, and generally provides a platform for execution of the software shown in FIG. 6.

Hardware 450 may execute an operating system 452 having a kernel 454 that provides the interface by which software executing within an execution environment provided by operating system 452 may access hardware 450. Kernel 454 may execute in a privileged space within operation system 452 referred to as "kernel space," which is separate from user space. Kernel space may provide kernel 454 increased privileges when accessing hardware 450. Kernel 454 may mediate access to hardware 450 using interrupts and exceptions to indicate when various operations performed by hardware 450 are complete (and provide access to any data or other information resulting from interactions with hardware 450). Kernel 454 may support the so-called user space in which one or more applications exist and interface with kernel 454 using an application programming interface (API) exposed by operating system 452.

Operating system 452 may, in this way, present the user space in support of execution of one or more applications 456A-456N ("applications 456"). Applications 456 may interface via the operating system API to issue various file system commands 457 in accordance with file system APIs. That is, the operating API may present an access server, which may represent a unit configured to mount a file system, unmount the file system, read requests from kernel 454 of operating system 452, issue replies to the requests, or other operations that facilitate access with underlying file systems. Examples of the access server may include one or more of FUSE, VFS, NFS, etc. The access server may, in other words, represent a layer that implements an API/protocol to which many clients adhere.

As further shown in the example of FIG. 6, operating system 452 may include a file system (FS) client API. FS client API 408 may represent a unit configured to interface with object server 416. FS client API 408 may include a number of functions that can be invoked to specify client operations to perform with respect to objects stored to a key-value (KV) store. In other words, FS client API 408 may represent a layer that implements service semantics for file system abstractions (thereby allowing interactions with various different types of file systems).

Client operations include a create operation that creates a new index node ("Inode") object and adds a name map entry in a directory object (or, in other words, updates a direction object to add a name of the Inode object in the file system hierarchy), a write operation in which data represented by at least one of the objects is written, a read operation in which data associated with one of the objects is accessed or, in other words, retrieved, a lookup operation in which at lease a portion of the directory (e.g., a name associated with the directory) is retrieved, a link operation in which an object is associated with a specified directory object, and an unlink operation in which an object is removed from a specified directory. Object client library 410 may represent a unit configured to provide a language specific binding to the object API.

Operating system 452 may configure kernel 454 to redirect file system commands 457 to FS client API 408, which may translate file system commands 457 to client operations 411 that implement the functionality of file system commands 457 but using semantics specific to object server 416. FS client API 408 thereby represents an intermediate abstraction that allows file system specific commands to be processed by file systems different than those supported by applications 456 and/or kernel 454. FS client API 408 may, in other words, represent a shim file system layer that allows for kernel 454 to interface with file systems that would otherwise be unsupported.

FS client API 408 may interface with object client library 410 to translate file system commands 457 to client operations 411. FS client API 408 may interface with hardware 450 (possibly via kernel 454) to issue client operations 411 to DPU 460.

DPU 460 may represent one example of any of the DPUs described throughout this disclosure, and may include a run-to-completion data plane operating system (OS) 462 configured to process work units. DPU 460 generally represents a hardware chip implemented in digital logic circuitry. As noted above, DPU 460 is a highly programmable I/O processor with a plurality of processing cores (as discussed above). In the illustrated example of FIG. 6, DPU 460 includes a network interface (e.g., an Ethernet interface) to connect directly to a network, and a plurality of host interfaces (e.g., PCI-e interfaces) to connect directly to one or more application processors and one or more storage devices (e.g., SSDs).

DPU 460 also includes a run-to-completion data plane operating system (OS) 462 executing on two or more of the plurality of processing cores. Data plane OS 462 provides data plane 464 as an execution environment for a run-to-completion software function invoked on data plane OS 462 to process a work unit. The work unit is associated with one or more stream data units (e.g., packets of a packet flow), and specifies the software function for processing the stream data units and one of the plurality of processing cores for executing the software function.

The software function invoked to process the work unit may be one of a plurality of software functions for processing stream data included in a library 470 provided by data plane OS 462. In the illustrated example, library 470 includes network functions (NF) 472, storage functions (STF) 474, security functions (SECF) 476, and analytics functions (AF) 478. Network functions 472 may, for example, include network I/O data processing functions related to Ethernet, network overlays, networking protocols, encryption, and firewalls. Storage functions 474 may, for example, include storage I/O data processing functions related to NVME (non-volatile memory express), compression, encryption, replication, erasure coding, and pooling. Security functions 476 may, for example, include security data processing functions related to encryption, regular expression processing, and hash processing. Analytics functions 478 may, for example, include analytical data processing functions related to a customizable pipeline of data transformations.

In general, data plane OS 462 is a low level, run-to-completion operating system running on bare metal of DPU 460 that runs hardware threads for data processing and manages work units. As described in more detail below, data plane OS 462 includes the logic of a queue manager to manage work unit interfaces, enqueue and dequeue work units from queues, and invoke a software function specified by a work unit on a processing core specified by the work unit. In the run-to-completion programming model, data plane OS 462 is configured to dequeue a work unit from a queue, process the work unit on the processing core, and return the results of processing the work unit to the queues.

DPU 460 also includes a multi-tasking control plane operating system executing on one or more of the plurality of processing cores. In some examples, the multi-tasking control plane operating system may comprise Linux, Unix, or a special-purpose operating system. In some examples, data plane OS 462 provides a control plane 466 including a control plane software stack executing on data plane OS 462. As illustrated, the control plane software stack includes a hypervisor 480, a multi-tasking control plane 4OS 82 executing within an execution environment provided by hypervisor 480, and one or more control plane service agents 484 executing on control plane OS 482.

Hypervisor 480 may operate to isolate control plane OS 482 from the work unit and data processing performed on data plane OS 462. Control plane service agents 484 executing on control plane OS 482 comprise application level software configured to perform set up and tear down of software structures to support work unit processing performed by the software function executing on data plane OS 462. In the example of data packet processing, control plane service agents 484 are configured to set up the packet flow for data packet processing by the software function on data plane OS 462, and tear down the packet flow once the packet processing is complete. In this way, DPU 460 comprises a highly programmable processor that can run application level processing while leveraging the underlying work unit data structure for highly parallelized stream processing.

In another example, instead of running on top of data plane OS 462, the multi-tasking control plane operating system may run on one or more independent processing cores that are dedicated to the control plane operating system and different than the processing cores executing data plane OS 462. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

Data plane OS 462 of DPU 460 is configured to receive stream data units for processing on behalf of the application level software executing on hypervisor and/or OS 452 of host 402. In the example of packet processing, the stream data units may comprise data packets of packet flows. In this example, the received packet flows may include any of networking packet flows, storage packet flows, security packet flow, analytics packet flows, or any combination thereof. Data plane OS 462 executing on one of the processing cores of DPU 460 may receive each of the packet flows in the form of one or more work units from a networking unit, host unit, or another one of the processing cores of DPU 460. Each of the work units for a received packet flow may be associated with one or more data packets of the packet flow. Upon receipt of the packet flow, data plane OS 462 performs a lookup in a flow table to determine that the packet flow is legitimate, and maps the entire packet flow to one of the processing cores of DPU 460 for serialized processing of the packets of the packet flow. The flow table may comprise a hardware implemented flow table that is updated and maintained with legitimate packet flows by control plane 466, and used to assign processing cores to packet flows.

In the case where the received packet flow is not recognized by data plane OS 462, e.g., the packet flow is not yet set up in the flow table, data plane OS 462 may send the packet flow through the slow path in control plane 466 for set up. Control plane service agents 484 executing on control plane OS 482 then determine that the packet flow is legitimate, and send an instruction to data plane OS 462 to set up the packet flow in the flow table.

Once the packet flow is set up by control plane service agents 484, data plane OS 462 may assign the packet flow to a particular processing core of DPU 460 that can do stream processing for the packet flow. As one example, data plane OS 462 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 462 also provides interfaces to one or more hardware accelerators of DPU 462 configured to perform acceleration for various data processing functions. Data plane OS 462 may use the hardware accelerators to process one or more portions of the packet flow, i.e., one or more work units, arranged as a work unit (WU) stack. In the WU stack, a first work unit includes an identifier of a subsequent work unit within the WU stack for further processing of the packets upon completion of the first work unit. To perform stream processing for the packet flow, a hardware accelerator is configured to perform one or more hardware commands included in the WU stack as input parameters of the first work unit, and upon completion of the one or more hardware commands, proceed to the subsequent work unit within the WU stack identified by the first work unit.

In the context of client operations 411, data plane OS 462 may process client operations 411 as one or more work units, pushing the handling of these client operation work units to control plane OS 482. As shown in the example of FIG. 6, library 470 may also include (or otherwise expose) an NVMe-KV controller 414, and an object server 416. DPU 460 is also, as further shown in the example of FIG. 6, communicatively coupled to a KV store 418 storing objects (OBJS) 420 for which DPU 460 is listed as the owner or, in other words, manager. NVMe-KV controller 414 may represent a unit configured to interface with non-volatile memory via the NVMe protocol and thereby provide access to KV store 418 and objects 420 stored thereto. Object server 416 may represent a unit configured to implement the basic primitives for the object types and that represents an extension of NVME-KV controller 414.

KV store 418 may represent one or more KV stores configured to store objects 420 of various types. Objects 420 may be associated with different object types, which may include a data object (e.g., of a number of sizes, such as 4 kilobytes—KB, 16 KB, and 128 KB, where such sizes are assigned during creation of KV store 418) that contains a portion of data belonging to a file, a file index node (Inode) object that includes attributes and a data map (which maps an offset to data objects), a directory object that includes a name map (mapping a name to an Inode object identifier—ID, which may refer to a cluster-wise unique ID in the format of a KV store ID:object ID and that is potentially never reused such that the object ID is a universally unique ID within the cluster of DPUs providing access to KV store 418) and an internal schema that can vary (e.g., list, hash, or block tree—Btree—etc.), and a superblock that includes an object ID of the root directory, configuration parameters, and a reference to a set of one or more KV stores.

Control plane OS 482 may execute, in one example, to present the file system that operates in accordance with various aspects of the techniques described in this disclosure. The file system may include KV store 418, where Control plane OS 482 leverages the name (or, in other words, key) mapping as well as the block allocation features of KV store 418. One or more DPUs 17 (of which DPU 460 is an example) may host KV store 418 dynamically, where additional KV stores may be added to or removed from the file system.

DPUs 17 (for which DPU 460 represents as one example) may define a directory or a file as one or more objects in one or more KV stores 418 that constitutes the file system. For a file, the node itself and data blobs are objects that reside in separate KV stores 418. For a use case in which a single directory is called up for a number of entries and/or concurrent operations, DPUs 17 may shard a directory across multiple objects (e.g., by hashing the entry name) residing in separate KV stores 418. Further, any link in the file system naming tree may span from one KV store to another KV store, where such link is represented by a combination of the KV store ID and the object ID within the identified KV store. An example of KV store 418 is described in more detail with respect to FIG. 7.

Returning to the client operation work units, object server 416 may process the client operation work units, performing various operations with respect to KV store 418 and/or objects 20 as described above in more detail. Object server 416 may ensure the above noted automaticity, ordering the work units in an effort to reduce locks and thereby increase throughput. Object server 416 may return read data, any metadata (such as names, directories, dates, timestamps, etc.), acknowledgements or any other data via one or more return messages 459. Control plane OS 482 may transmit the return messages via data plane OS 462 as one or more packets back to host 402, where FS client API 408 may process return messages 459, providing any data, metadata, and/or acknowledgements to kernel 454, which may issue one or more interrupts 409 to application 456A that inform application 456A that an operation is complete or that data is available, etc.

Figure 7:
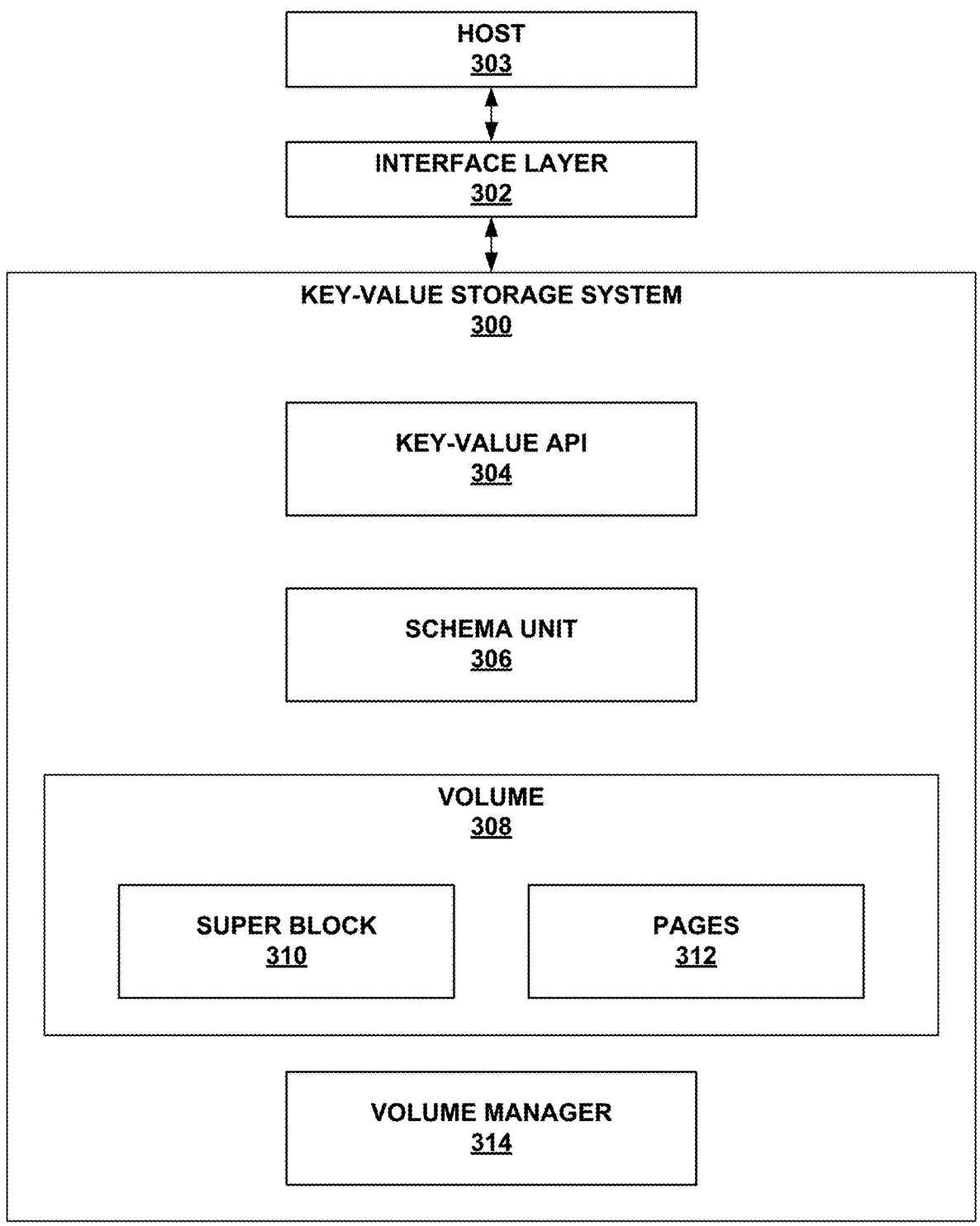
FIG. 7 is a block diagram illustrating an example system that may be configured to perform various aspects of the techniques described in this disclosure.

FIG. 7 is a block diagram illustrating an example software architecture of a key-value storage system 300, in accordance with one or more techniques of this disclosure. In the example of FIG. 7, key-value storage system 300 comprises an interface layer 302, a key-value API 304, a schema unit 306, a volume 308, a super block 310, a set of one or more pages 312, and a volume manager 314. Volume 308 comprises a storage area that contains super block 310 and the set of one or more pages 312. Volume 308 may be implemented in external memory 210 (FIG. 5). Interface layer 302 may receive commands from a host 303 via a communication bus. In some examples, host 303 is a work unit handler (WUH). Key-value storage system 300 may execute commands received by interface layer 302 in a first-in-first-out fashion. A control plane may use volume manager 314 to create volumes. Volume manager 314 may also track and manage the volumes.

Key-value API 304 may implement an interface having operations for storing values in a key-value store and retrieving values for the key-value store. The operations may have parameters, such as keys, values, and so on. In some examples, Key-value API 304 may check and enforce parameter constraints. Schema unit 306 may implement hashing logic of mapping keys to slots in pages 312. Super block 310 may be stored at the start of volume 308 and may contain key configuration parameters and statistics for key-value storage system 300.

Volume 308 comprises a storage area that may contain super block 310 and pages 312. Volume 308 may be stored in a block volume, a durable block device. A block volume is a volume that may be read from and written to in units of a block (e.g., a set of bits). Super block 310 may contain key configuration parameters, a globally unique identifier (GUID) to uniquely identify volume 308, status fields, and other data. The configuration parameters may include one or more of a slot size, a page size, a number of pages, data regarding quality of service (QoS) requirements, data regarding encryption techniques, data regarding types of compression used in pages 312, data regarding durability, and so on. The status fields of super block 310 may record information such as whether a resize operation is in progress. The status fields may also record information such as periodically-captured statistics. Such statistics may include count operations, bytes transferred, space utilized, chain length, and so on.

Each of pages 312 may comprise a block of storage locations that may be read from or written to. In some examples, each of pages 312 has a configurable size. In some examples, the size of a page may be in a range of 4 KB to 64 KB. Each of pages 312 comprises a set of slots. Each slot is a set of storage locations within a page. In some examples, the slots are fixed size slots. Thus, in such examples, each of the slots in a page has the same size. Conceptually, a slot stores at least a key and value data. However, in some examples, slots may be stored in two separate pieces. In such examples, one of the pieces stores a key and another one of the pieces stores value data. The separation of a slot into the two separate pieces may allow for better cache line utilization when matching keys with slots in the page. For instance, the keys may be stored in a first set of consecutive memory locations and the data may be stored in a second set of consecutive memory locations. Thus, data in the first set of consecutive memory locations may be copied from a memory into a cache line such that a processor may quickly check the keys without needing to read the value data corresponding to the keys from the memory. The separation of slots may also enable input/output (I/O) optimization with larger page sizes.

In some examples, a slot contains a slot header and value data. The slot header of a slot contains a key associated with the slot. Additionally, the slot header of a slot may contain metadata associated with the slot. The metadata associated with the slot may include a reference count for the slot, a size of the value data (e.g., an uncompressed size of the value data), a compressed size of the value data, a timestamp, and/or other data associated with the slot. When a page is initialized, the reference count for the slot has a value (e.g., 0) indicating that there are no references to the slot. A slot is considered to be unused (i.e., empty) when there are no references to the slot. When the reference count for the slot indicates that there are one or more references to the slot, the slot is considered to used. The reference count for the slot may be incremented when a key-value pair is stored in the slot.

Furthermore, in some examples, each of pages 312 includes a respective page header. The page header of a page may include a globally unique identifier (GUID) that schema unit 306 may use used to detect whether the page has been initialized to be part of volume 308. In some examples, the page header of a page includes an error detection code for checking the integrity of the page. Example types of error detection code usable in the page of header of a page may include cyclic redundancy check (CRC) codes, repetition codes, parity bits, checksums, or other types of data usable to determine whether data in the page differs from data on which the error detection code was generated. In some examples, when schema unit 306 reads a page, schema unit 306 validates the GUID and the CRC. If the GUID is not set, the page is initialized. This allows lazy initialization of pages for a key-value store.

Figure 8:
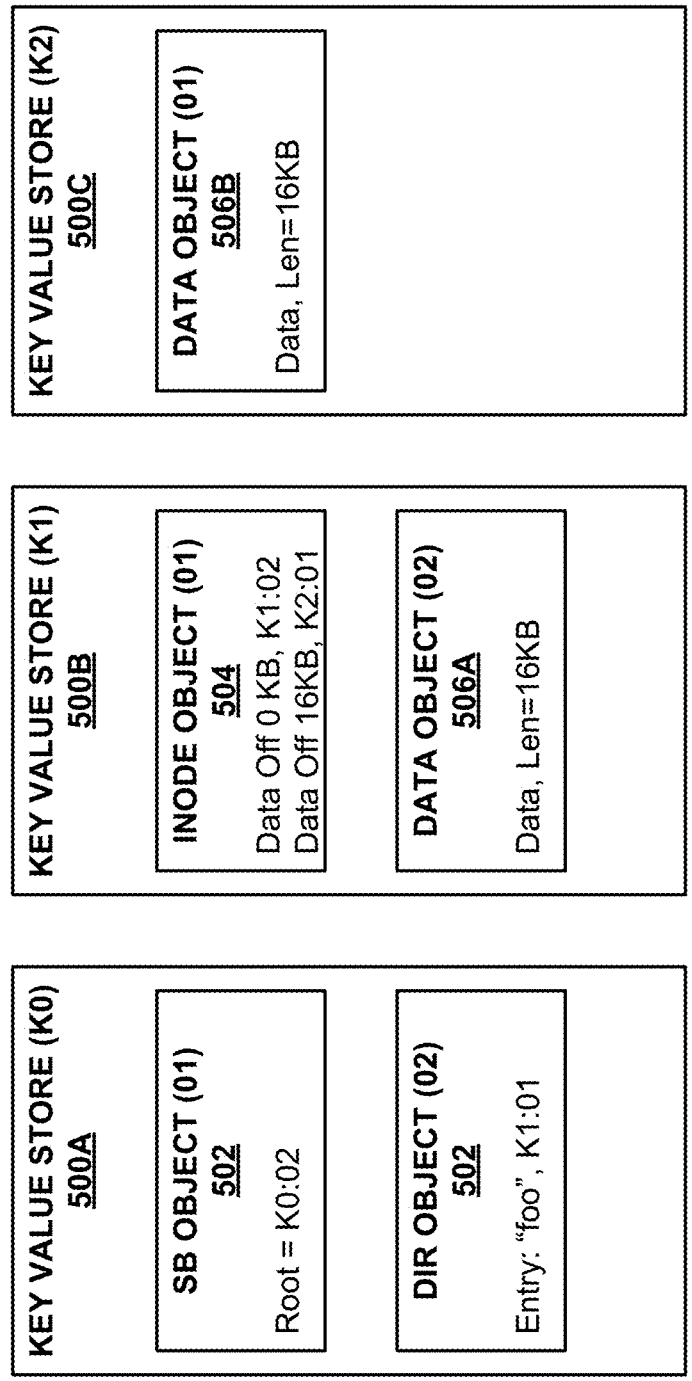
FIG. 8 is a block diagram illustrating an example of the KV store of FIG. 7 that forms part of a file system that operates in accordance with various aspects of the techniques described in this disclosure.

FIG. 8 is a block diagram illustrating an example of the KV store of FIG. 7 that forms part of a file system that operates in accordance with various aspects of the techniques described in this disclosure. As shown in the example of FIG. 8, KV store 418 includes three KV stores 500A-500C ("KV stores 500"), each of which is respectively associated with a KV store ID of K0-K2. KV store 418 represents an organization for the file "/foo" of size 32 KB composed of two data objects 506A and 506B (associated with respective data object IDs of K1:02 and K2:01).

KV store 500A includes a filesystem superblock (SB) object 501 identified by object ID K0:01 and including a reference to a directory root object ID (e.g., K0:02). KV store 500A also includes a directory (DIR) object identified by object ID K0:02 and identifying an Inode object 504 associated with a file named "foo" having an object ID K1:01. KV store 500B may include Inode object 504 defining data offsets ("Off") for the file named "foo" stored to a first data object 506A of size 16 KB and identified by object ID K1:02, and a second data object 506B of size 16 KB and identified by object ID "K2:01." KV store 506A may also include data object 506A including data (which may be referred to as a data blob) of size 16K. KV store 506C includes data object 506B having data of size 16K.

The sequence of KV operations done by host 402 to delete "/foo" in the above example is as follows (where several of the steps to locate the objects may be avoided with client side caching), where step 1 below may attempt to atomically remove the entry if it exists (but when it does not exist, there is no action taken and an error can be returned for the filesystem operation):

1. foo_inode=Root.DeleteEntry("foo")
2. count=foo_inode.DeleteRefo
3. If count is zero, goto step 5;
4. Else for each range (e.g., one megabyte—1 MB):
   a. Data[ ]=foo_inode.GetDataObject(range)
   b. For each data object, Data[i].Deleteo
5. foo_inode.Deleteo Referring back to the example of FIG. 7, object server 416 may implement, in addition to standard KV primitive backend operators (e.g., put, get, delete, etc.), a set of backend operators that are specific object types. Object server 416 may implement these custom backend operators in order to enable serialized operations on the object without potentially requiring the client (which in this example is shown as host 402) to lock and do read-modify-write operations.

Object server 416 may implement, for a directory object, one or more of a lookup backend operator to retrieve some or all of the directory stored to an identified direction object, an add backend operator to add a directory to the file system, a delete backend operator to delete some or all of the directory from the file system, a list backend operator to retrieve names associated with some or all of the directory, and a rename backend operator to rename a directory.

For an Inode object, object server 416 may implement a get data object backend operator to identify which data objects are associated with a file represented by an identified Inode object, and a put data object to add an association with a data object to the file represented by the identified Inode object. In addition, object server 416 may also implement, for the Inode object, a get attribute backend operator to retrieve attributes associated with the identified Inode object, a set attribute backend operator to define attributes associated with the identified Inode object, an add reference backend operator to add a reference to the identified Inode object, a delete reference backend operator to delete a reference to the identified Inode object, a delete backend operator to delete the identified Inode object, a lock backend operator to lock the identified Inode object, and an unlock backend object to unlock the identified Inode object.

For a data object, object server 416 may implement a read backend object to retrieve data associated with an identified data object, a write backend object to write data to the identified data object, and a delete backend operator to delete the identified data object. For a superblock object, object server 416 may implement a statistics (stat) backend operator to retrieve or otherwise compute statistics associated with an identified superblock object, and an add store backend operator to add a KV store to the file system.

To create the file system, an administrator may interface with a control plane (meaning the administrative or control portion of data center 10—such as controller 21 shown in FIG. 1) to issue a make file system (mkfs) command. As part of the mkfs command, the control plane creates KV store 418 (based on passed parameters) and then creates two objects: 1) a superblock object (where there is generally one per file system); and 2) a root directory object (where again there is generally one per file system). The superblock objects includes information about the file system parameters, such as block size, KV stores used, etc. along with the object ID of the root directory (as discussed above with respect to FIG. 8). Assuming that the file system is successfully created, the control plane stores the mapping information between the file system name (which may be similar to a universally unique ID—UUID) and KV_UUID:Superblock_OID (where OID refers to an object ID).

When a new file system node (e.g., DPU 404) is to mount a specific file system, DPU 404 may query the control plane with the file system name and receives, responsive to this query, the above noted mapping information that contains the KV_UUID and Superblock_OID. DPU 404 may next perform a KV namespace creation via NVMe-KV controller 414 using an NVMe attach specifying the KV_UUID. Assuming the attach is successful, NVMe-KV controller 414 may issue a KV retrieve command to read the superblock object and, from the contents of the superblock object, get the root directory object ID.

The administrator may interact with the control plane to add a new KV store to the file system, specifying a DPU, such as DPU 404, where the new KV store is to be created. The control plane may then update the superblock of the file system to reference the new KV store (e.g., by way of KV_UUID).

Each file system directory resides as a hash across one or more directory objects (each can be in a separate KV store). Each directory object includes directory attributes, such as size, atime, mtime, ctime, ownership and other metadata (such as directory layout type, etc.). Each directory object also includes one or more name to object ID mappings. KV store 418 may maintain the directory attributes information in a dictionary. When there is additional space after saving the attributes in the dictionary in the directory object, the file system may use the remaining space for directory entries.

The file system may maintain the directory as a list of entries with or without hashing. In the event the directory exceeds the space allocated for the directory object, the file system may allocate a large value store (LVS) and transition to a hash based directory. KV store 418 may advertise a maximum size of the dictionary slot that is available towards use of value data so that upper layers may identify when to change the directory organization scheme. When the size of the directory exceeds the size of the directory object, KV store 418 may continue to maintain the directory attributes part of the data in the dictionary and the file system uses the LVS allocation as an array of pages with each page containing a set of fixed size slots (128 bytes). Each directory entry spans one or more slots depending on the length of the name and is described by the below information:

```
Struct direntry {
    uint32_t crc;
    uint32_t hash;
    uint8_t free;
    uint8_t namelen;
    uint32_t filetype and mode information;
    kv_oid_t objid
    char   name[ ]; /*Variable length */
};
```

The lookup backend operator may perform a hash on a directory name to locate a particular page (in the LVS) and start looking from slot 0 of the page (where slot 0 is either the start of a new entry or a free entry) to find the first entry that matches the hash value. When a free unused entry is found, the lookup backend operator may return without a match. When there is a match for the hash value, the lookup backend operator may compare the name provided to the lookup backend operator and the accessed name stored to the slot (or possibly slots). The lookup backend operator may continue in this manner until a valid entry is located or a free entry is located (or possibly until a threshold number of entries are changed for a maximum number of pages).

To add a new entry, the add backend operator for the directory may operate similar to the lookup but instead attempt to identify a required number of contiguous slots to store the name provided to the add backend operator. The remove backend operator is similar to the lookup backend operator except that the matching slots are marked as free.

In some instances, the file system may encounter some threshold number of pages when searching for available (or, in other words, free) slots. After accessing a number of pages that equals and/or exceeds the threshold number of pages, the file system may determine that the directory requires resizing. The file system may construct a larger directory hash tree in memory and rewrite the entire larger directory object information to KV store 418. The file system may allocate a large amount of memory to rewrite the resized directory object in one atomic KV put operation, but some flexibility may be gained through the file system using a list of pointers so as to potentially reduce the need for a single contiguous memory allocation (which may be unavailable in certain high use instances).

As discussed above, the general architecture of the file system attempts to avoid complex distributed locking and transactions (e.g., two phase commit). Instead, the file system manages synchronization on a per object basis within the owner DPU. For operations that involve multiple objects, the file system may sequence the operations correctly in a manner that supports, as one example, POSIX semantics. A few example of multi-object operations include multiple writes to a file with adjacent/overlapping regions to which data is being written, conflicting rename operations, and conflicting create operations.

The file system may providing a synchronization model that distinguishes between two form of integrity. First, the file system may attempt to provide structural integrity in terms of ensuring file system metadata (e.g., the tree of objects that represent the file system) remains accurate. The file system may preserve structural integrity by using atomic updates done by KV primitives and having the file service release any unused objects resulting from a failed operation or during crash recovery. For complex operations that require atomic structural updates across objects, the file service will use locking primitives provided on a per object basis.

Second, the file system may attempt to provide semantic integrity, which consists of the data in the file system as defined per the semantics of the access protocol. In the case of POSIX compliant access, the file system treats each read and write call as having atomicity, consistency, isolation, and durability (ACID) properties. In the case of HDFS and analytics oriented file system workloads, the file system may only append data (and does not overwrite data).

As noted above, the file system may support locking on a per object basis. The file service supporting the file system may use two different types of locks to support various POSIX semantics. The first type of lock may be referred to as a lease lock, where the file object supports a lease lock (including support for a byte range) operation that can be used to serialize read/write operations of a section of the file. A successful lease lock returns a token that includes an expiry time as well as a monotonically increasing sequence number. The file service may expand the range to align to data blob boundaries to avoid multiple clients from accessing the same blob, which may result in a lock on a range of data blobs.

A blob refers to a binary large object, which is a collection of binary data stored as a single entity in a database management system. A blob object (which may store file data) supports a lock token parameter as part of the store/retrieve operation, and a request to read or write to the block object may fail unless the token is valid (meaning 1) not expired—which may rely on time synchronization between DPUs 17, and 2) the associated sequence number is greater than that used for a previous access—meaning that access may be done in increasing order of sequence number).

The second type of lock is referred to as a persistent lock, which has the same semantics as the lease lock, but is stored persistently (e.g., in KV store 418). The persistent lock may also differ from the lease lock in that the persistent lock has no expiry time. A persistent lock may prevent any other client operation (read or write) on the object.

Given the above primitives (including the lock primitives), the file service may implement POSIX compliant read/write atomicity. To perform read and writes, the file service may acquire byte range lock on the file object based on a range being accessed (as specified in the client operation). The file service may next update (in order or file offset) the blobs. When an operation fails, the file service may report the partial request to the file service (e.g., return a parameter to the system call), thereby increasing visibility of the partial result to other clients, which is similar to how a local file system may behave when there is a crash. Alternatively, the file service may retire the entire operation in response to a failed operation.

As noted above, there are a number of multi-object operations to consider when ensuring POSIX compliance, one of which was a rename operation. The sequence to implement a case of renaming A/B to C/D where C/D is an existing file is as follows:

1. Acquire a persistent lock (PL) on the object A as identified by the correct object ID (A_OID)—Acquire PL(A_OID);
2. Acquire PL on object C as identified by the correct object ID (C_OID)—Acquire PL(C_OID) (In some example, step 2 may time out, and the file service may release the PL on object A and retry step 1 to avoid a deadlock with another rename where the source and target directories are reversed. The file service may also avoid the deadlock by acquiring the locks in a compute order—e.g., by value of OID);
3. Set object B ID (B_OID) equal to a value returned by the directory object type lookup backend operator referencing A_OID, and the value "B"— B_OID=Lookup(A_OID, "B");
4. Set a previous_OID (Prev_OID) variable equal to the value returned by a directory type add backend operator referencing C_OID, the value "D," and the B_OID, where such add backend operator returns a previous OID for an overwrite, and possibly a flag to indicate the overwrite as part of the add operation— Prev_OID=Add(C_OID, "D", B_OID;
5. Implement a director type delete backend operator to delete objects A and B—Delete (A_OID, B_OID);
6. If the file service obtained a Prev_OID (step 4), set a link count (LC) equal to a link decrement backend operator referencing the Prev_OID, which returns a link count (and could be a value of zero);
7. Release PL(C_OID);
8. Release PL(A_OID0; and
9. When LC is equal to zero, perform a data object delete backend operator referencing the Prev_OID, which will delete the object (where the foregoing sequence is described separately as it is common to normal 'rm' operation).

In some instances, the file service maintains an intent log and such an intent log for the rename operation may be added to the file system journal so that the file system may perform a replay in the event of a crash. When the FS client API 408 crashes, the file system may redo the operation. Because the persistent locks on the directory objects are still held, no other intervening operation are allowed. In the event of a crash, the directions may become inaccessible until the journal is recovered (by a restart of the client) or another client taking over the journal recovery.

In terms of logging and recovery, the file system (presented by OS 412 via NVMe-KV controller 414, object server 416, KV store 418, and its extension within host 402, such as access server 406, FS client API 408, and object client library 410) may perform updates to files that result in several modifications that need to be atomic to maintain consistency and avoid leakage of storage space, where the file system treats the updates as transactions that are made atomic with the aid of journaling, or in other words, logging. The journal log may also provide faster response time as the update can be acknowledged once the log entries are made durable.

The following are some of the design aspects related to journaling:

1. Owner—Host 402 may be designated as the owner of the journal and take care of the life cycle of journal transactions. As part of mounting the file system, host 402 may read the superblock and also performs a journal open client operation, which may return the handle for the journal (as stored to KV store 418). Alternatively, DPU 404 may transparently handle the journal. However, because many of the metadata operations would possibly involve many DPUs 17 (of which DPU 404 is an example), each of DPUs 17 may be configured to send KV commands to other DPUs 17 that introduce state and complexity.
2. Location—The journal may reside as a special object ("client object") inside KV store 418 so that KV store 418 manages the journal. When host 402 mounts a file system, host 402 get allocated a unique client object. As such, the journal may reside in any KV store and each KV store may have many client objects. The control plane may perform a recovery (if needed) based on the journal and delete the client object when a client gets unmounted.

3. Records Structure—Each transaction record in the journal may contain the following fields:
   a. Journal version, which may allow for future journaling records;
   b. Transaction ID ("Tran ID"), which may be a unique monotonically increasing number for each transaction;
   c. Subtran ID, which, for transaction that require more than one piece of metadata update, identifies individual updates and allows tracking of all updates that are part of the same transaction; and
   d. Record type, which distinguishes between three different types of records (a commit record, an abort record, and an update record).

Once the records associated with a transaction are completed, the file system may overwrite old transactions in the journal to reclaim space (or otherwise perform space reclamation). Space reclamation may result in the file system tracking a state of all outstanding transaction (possibly oldest to newest) in the file system and reclaiming all available space whenever an oldest transaction is completed.

The file system may reserve sufficient space for the journal. The file system may reservice this space to prevent deadlock to due to a lack of space in the journal. When the file system is performing too many outstanding transactions to start logging at the same time, the file system may be unable to guarantee that they have enough space to log all subtransactions.

The file system client may, during a replay (e.g., after a crash), scan the journal to first figure out the valid portion of the journal having outstanding transactions. The file system client may scan the log from beginning to end, attempting to identify a break in the transaction IDs. The file system client may then undo all identified transactions.

OS 412 may prevent object leak in KV store 418 due to a crash or unexpected shutdown when it is in the middle of a transaction update using the following scheme. First, OS 412 may track newly created object IDs before the object IDs are logged in the journal so journal recovery can perform a journal cleanup. Host 402 (and every other client) may send allocation requests to get the unique object ID token from KV store 418, which has a short lifetime and is used only once. When the KV store 418 does not receive a create operation within this lifetime, the object ID token is not honored by KV store 418. The object ID token and processing may be required to prevent any bug in host 402 causing inconsistency in KV store 418 by reusing a bad object ID token.

In order to avoid the complexity (and/or resource consumption) in having KV store 418 track all outstanding object ID tokens, a token may include both a timestamp to track the time of creating and an object ID. When host 402 presents the token at a later point in time for the create operation, host 402 may calculate the time elapsed and decide if the token has expired or not.

Alternatively or in conjunction with host 402, operating system 412 may implement the functionality of object ID token verification within the object ID itself. In other words, the object ID itself may have a timestamp component such that no special token need be generated to track creation time of the object ID. A create operation may involve the following steps:

Time zero (T0): oid_token=KV1.objectID.alloc( )
   T1: Log creation of KV1.oid_token
   T2: Send KV1 file object create command with object id token 'oid_token'
   T3: KV1 checks if the oid_token is valid and has not expired. KV1 also verifies that the object ID is not currently in use
   T4: KV1 returns the newly created file object's OID
   T5: Log adding 'KV1:OID' to directory object 'DIR_OID' with associated name
   T6: Send KV2 director add (DIRADD) command for (name, KV1:OID)
   T7: Log transaction as done Assuming there is a crash after TO and before T5, the control plane performs a recovery, during which the control plane may delete the object from KV1. Assuming instead that there is a crash after T5, but before T7, the control plane performs a recover, during which the control plan may perform a lookup on directory object 'DIR_OID' for 'OID' and only deletes the object when the lookup fails to identify the entry in the directory object. In this second instance, when reference information is missing, the control plane may add the missing reference information.

Host 402 or OS 412 may perform the journaling in accordance with a journal API. The journal API may include GET and PUT commands (which may be blob API commands) at specified offset and length.

The file system may also support snapshots. A snapshot is a copy of the file system. Each snapshot of the file system includes a copy of the superblock and the tree of objects which may be partially shared with unmodified portions of the live filesystem and, after the file system completes the snapshot, the file system performs a copy-on-write (COW) to perform updates with respect to the snapshot. Assuming that file data gets overwritten, the file system may create a new data object in the snapshot with the previous data and inserts the new data object into a corresponding Inode object, which in turn would result in a COW operation of the Inode object and so on until COW propagates up the chain to the root directory. During the snapshot create operation, the file system may "freeze" on all clients while the snapshot creation is in progress.

In terms of performance, the foregoing file system architecture may achieve high performance and scalability by providing fine grained parallelism to objects in the file system tree, including shards of an individual file. Further, operations for any object are done directly to the KV store 418 that owns the object.

For parallel file access in certain applications, such as high performance computing (HPC), artificial intelligence (AI), and video surveillance, the file system may support large numbers (thousands to tens of thousands) of compute nodes to read/write areas of a shared file. Each node may directly performing input/output (IO) operation with respect to the appropriate shard (blob) of the file. The general model for a read is as follows:
   1. Data_OID=GetDataObject(File_OID, offset); and
   2. Get(Data_OID, off, len).

When the application is not doing concurrent writes, no locking may be required. When the application is doing concurrent writes, the file system may enable locking by indicating a mount option for the file system or a more fine-grained attribute setting on the file. The read may, in these instances, be done as follows:
   1. Toekn=LockByteRange(File_OID, off, len);
   2. Read data/*same as with no locking*/; and
   3. UnlockByteRange(File_OID, Token).

For name traversal, when an application uses an absolute pathname for an operation, the file system can walk the file tree one directory at a time. Such a walk may result in the file system performing a KV operation for each intermediate directory. To avoid this overhead in performing the KV operation, host 404 may cache directory pathnames (path to OID map). Host 404 may invalidate the cache when an intermediate directory is deleted/renamed, which may be performed via a notification service from KV store 418 to host 404 based on registration (or other processes).

Operation to a single directory may be constrained by KV store performance within a node (e.g., DPU 404). In some instances, performance should be relatively quick (or, in other words, fast) in terms of response times as the file system may maintain low dictionary occupancy. As an example, for Flash based storage media, a single page read/write may yield a rate close to one million IOPS.

Relative to other architectures (such as the IBM GPFS which utilizes a shared backend, or Ceph, which utilizes object/container backend with separate metadata servers), the file system provided in accordance with various aspects of the techniques described in this disclosure may provide the above noted smart object that are symmetrically stored in multiple KV containers.

The foregoing may provide one or more of the following advantages:
1. Simplifies locking when updating an object, where the node that owns the object can synchronize updates locally rather than client nodes performing read-modify-write with locking;
2. Use of object UUIDs and locking across updates simplifies crash failure recovery, where the file system may use ordered updates and journaling to ensure that the file system graph remains consistent;
3. Reduces read/write amplification for metadata operations;
4. Provides a scalable cache and lock management system; and
5. Increases parallelism.

In some implementations, the file system may utilize an external gateway, which could result in faster time to market and allow for independent scaling of the NFS tier. An existing code base may then be utilized that runs on a standard x86, and then offload the data path to a DPU. An open source NFS server (e.g., Ganesha) may be used for the gateway.

In this way, the foregoing described file system may provide the following:
1. A standard API for the data path;
   a. Local file system (e.g., via FUSE);
      i. Uses standard network connection to access DPUs;
      ii. Accelerated by PCIe attached DPU;
   b. Network file system (e.g., via NFS);
2. Primary data path may execute on DPUs with control and enhanced features supported via interactions with a standard CPU (x86), where protocol gateway on the standard CPU may facilitate access to the DPUs; and
3. Scale-out architecture;
   a. Each file system instance can scale across multiple DPUs for redundancy and capacity;
   b. Large files can be scaled across multiple DPUs;
   c. Large directories can be scaled across multiple DPUs;
   d. No single point of failure;
   e. Large number of file system instances can be supported (e.g., 1000s per DPU); and
   f. Control plane APIs to configure and manage resources.

Figure 9:
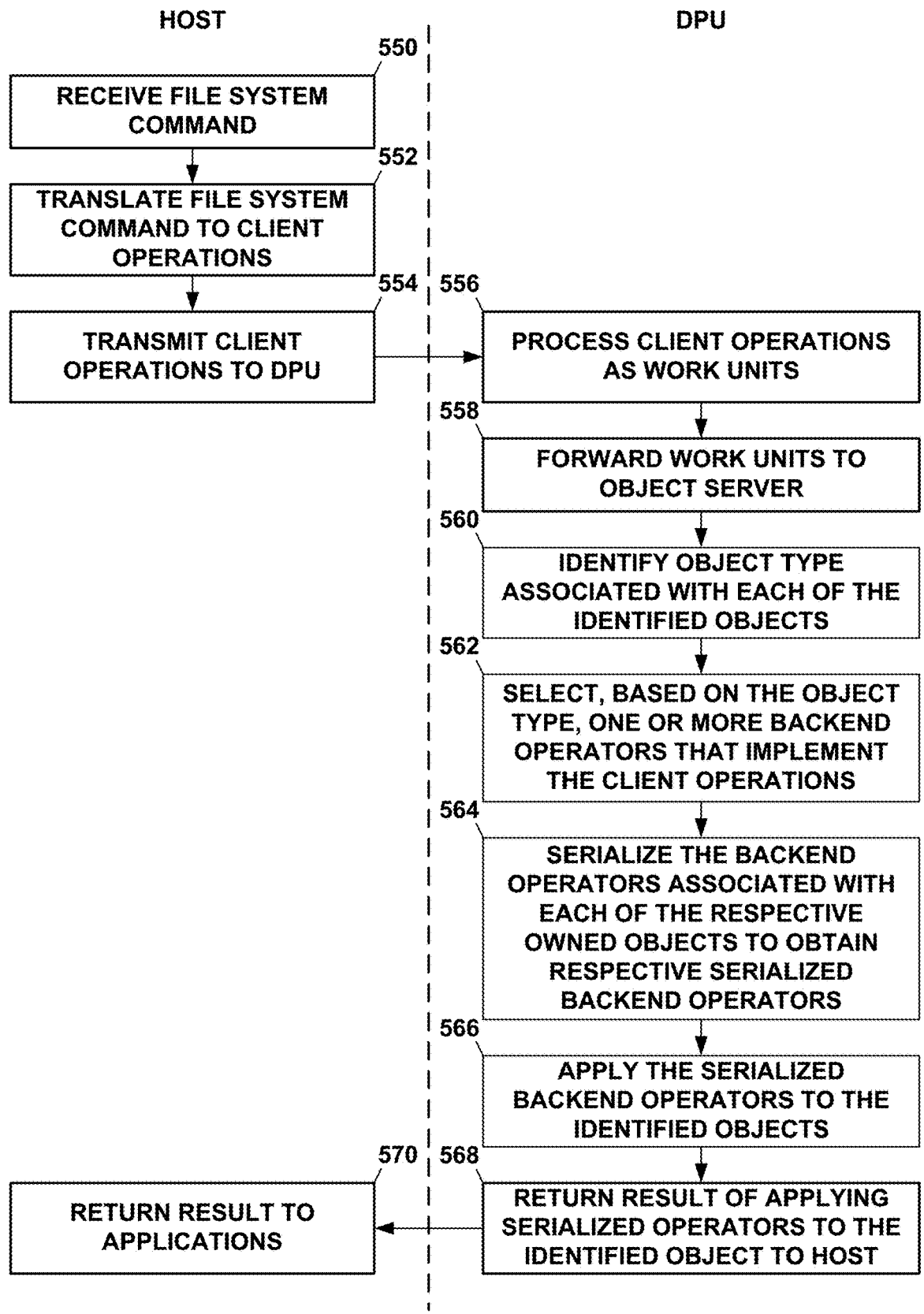
FIG. 9 is a flowchart illustrating example operation of the system shown in FIG. 6 in performing various aspects of the techniques described in this disclosure.

FIG. 9 is a flowchart illustrating example operation of the system shown in FIG. 6 in performing various aspects of the techniques described in this disclosure. As noted above, operating system 452 may receive file system commands 457 (550) and redirect file system commands 457 to FS client API 408, which may translate file system commands 457 to client operations 411 that implement the functionality of file system commands 457 but using semantics specific to object server 416 (552). FS client API 408 may interface with object client library 410 to translate file system commands 457 to client operations 411. FS client API 408 may interface with hardware 450 (possibly via kernel 454) to transmit client operations 411 to DPU 460 (554).

Data plane OS 462 may process client operations 411 as one or more work units (556), forwarding the handling of these client operation work units to object server 416 executing in data plane 464 (558). Object server 416 may process the client operation work units, performing various operations with respect to KV store 418 and/or objects 20 in accordance with various aspects described in more detail throughout this disclosure.

To process the client operations, object server 416 may identify an object type associated with each of the identified objects (560). That is, objects may correspond to one of a number of different object types, each of which may be associated with a different set (which should be understood to refer to a non-zero set, and not the mathematical definition of sets that includes non-zero sets) of backend operators.

As such, the objects may differ from objects associated with other object-based file systems in that the objects include integrated operators that may relieve non-managing DPUs 460 (such as those that originate the client instructions) from reserving processor cycles (and other resources, such as memory, memory bandwidth, bus bandwidth, etc.) in an effort to ensure compliance with standards, such as the above noted POSIX, or otherwise ensure file system integrity (e.g., structural integrity and/or semantic integrity) using read/write atomicity, locks (which may also refer to tokens), and other mechanisms. Offloading managing of file system integrity may be restated as distributed management of file system integrity as each managing or owner DPU may perform some portion of file system integrity with respect to those object for which the owner DPUs are responsible or managing, thereby potentially alleviating or at least reducing the extent of the bottleneck.

DPU 460 may then each select, based on the object type, one or more backend operators that implement the plurality of client operations (562). Object server 416 may each serialize the backend operators associated with each of the respective owned objects to obtain respective serialized backend operators (which may be referred as a serialized backend operator subset from the perspective of DPU 460 that are applied to an owned object subset) (564). Object server 416 may serialize the backend operators in an effort to identify when locks are to be used to ensure that multiple writes to the same object do not occur out of order such that data integrity is compromised.

That owner DPU 460 individual manages locks rather than the requesting DPUs 17 that issued the client operations is one example of offloading of client processing that may otherwise occur in the example file systems listed above. Further, serialization as discussed herein may promote atomicity and thereby potentially ensure data integrity, while also reducing unnecessary locking of objects (or portions thereof) to further tolerate highly-parallel access to objects.

Object server 416 may next apply the serialized backend operators to the identified objects (566). Object server 416 may apply the respective subset of the serialized backend operators to the identified objects for which DPUs 460 is responsible (or, in other words, manages or owns). The backend operators may differ from the client instructions. As described above, one or more of the backend operators may implement the foregoing client operations, where the various backend operators may differ based on the type of object.

In this way, object server 416 may ensure the above noted automaticity, ordering the work units in an effort to reduce locks and thereby increase throughput. Object server 416 may return read data, any metadata (such as names, directories, dates, timestamps, etc.), acknowledgements or any other data via one or more return messages 459 (568). FS client API 408 may process return messages 459, providing any data, metadata, and/or acknowledgements to kernel 454, which may issue one or more interrupts 409 to application 456A that inform application 456A that an operation is complete or that data is available, etc. In this way, host 402 may return the results to applications 457 (570).

Figure 10:
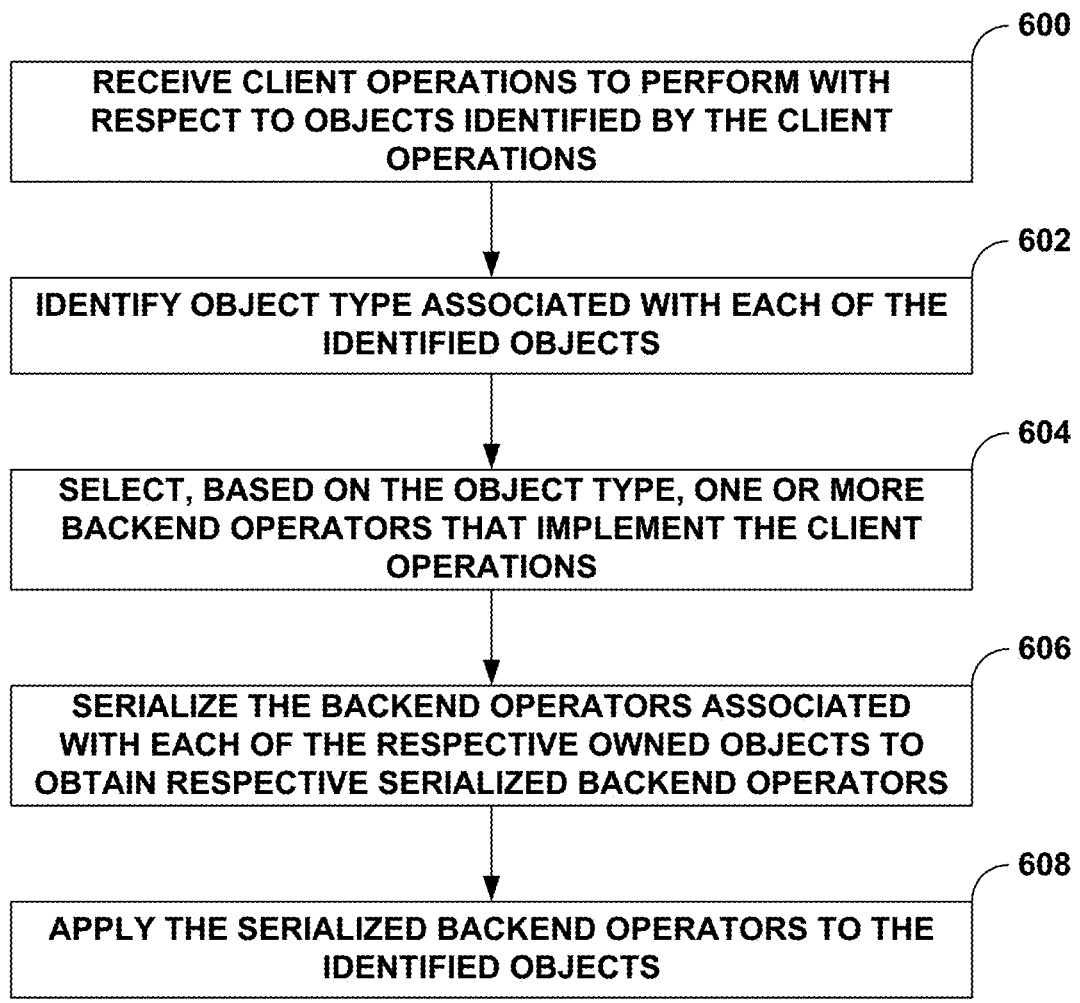
FIG. 10 is a flowchart illustrating example operation of the data processing unit of FIG. 7 in performing the file system management techniques described in this disclosure.

FIG. 10 is a flowchart illustrating example operation of data processing unit 460 of FIG. 6 in performing the file system management techniques described in this disclosure. Data processing unit 460 ("DPU 460") may receive a plurality of client operations to perform with respect to objects of the file system identified by the client operations (600). DPU 460 may originate the various client operations, sending the client operations to DPU 17 (FIG. 1) that are responsible for (or, in other words, own or manage) the objects identified by the client operations. DPU 460 may generate the client operations responsive to requests regarding the underlying data (such as a write request, read request, modify request, etc.) received from customers 11 and/or service provider network 7.

DPU 460 may own the underlying objects stored to the storage nodes (such as storage nodes 12 shown in the example of FIG. 1). Furthermore, DPUs 460, as part of presenting the file system, may store the objects in a hierarchical manner that allows for different hierarchies of objects. DPU 460 may maintain, locally, within each of the hierarchy of objects, where one such object in the hierarchy (a so-called directory object) may identify the owner or manager. DPUs 17 may then transmit (possibly via switch fabric 14) the client operations to the managing DPU (e.g., DPU 460), which may receive and then process the client operations.

DPU 460 may each process the client operations for the respective objects for which DPU 460 is listed as an owner (or, in other words, manager). To process the client operations, DPU 460 may identify an object type associated with each of the identified objects (602). That is, objects may correspond to one of a number of different object types, each of which may be associated with a different set (which should be understood to refer to a non-zero set, and not the mathematical definition of sets that includes non-zero sets) of backend operators.

As such, the objects may differ from objects associated with other object-based file systems in that the objects include integrated operators that may relieve non-managing DPUs 460 (such as those that originate the client instructions) from reserving processor cycles (and other resources, such as memory, memory bandwidth, bus bandwidth, etc.) in an effort to ensure compliance with standards, such as the above noted POSIX, or otherwise ensure file system integrity (e.g., structural integrity and/or semantic integrity) using read/write atomicity, locks (which may also refer to tokens), and other mechanisms. Offloading managing of file system integrity may be restated as distributed management of file system integrity as each managing or owner DPU may perform some portion of file system integrity with respect to those object for which the owner DPUs are responsible or managing, thereby potentially alleviating or at least reducing the extent of the bottleneck.

DPU 460 may then each select, based on the object type, one or more backend operators that implement the plurality of client operations (604). DPU 460 may each serialize the backend operators associated with each of the respective owned objects to obtain respective serialized backend operators (which may be referred as a serialized backend operator subset from the perspective of DPU 460 that are applied to an owned object subset) (606). DPU 460 may serialize the backend operators in an effort to identify when locks are to be used to ensure that multiple writes to the same object do not occur out of order such that data integrity is compromised.

That owner DPU 460 individual manages locks rather than the requesting DPUs 17 that issued the client operations is one example of offloading of client processing that may otherwise occur in the example file systems listed above. Further, serialization as discussed herein may promote atomicity and thereby potentially ensure data integrity, while also reducing unnecessary locking of objects (or portions thereof) to further tolerate highly-parallel access to objects.

DPU 460 may next apply the serialized backend operators to the identified objects (608). DPU 460 may apply the respective subset of the serialized backend operators to the identified objects for which DPUs 460 is responsible (or, in other words, manages or owns). The backend operators may differ from the client instructions. As described above, one or more of the backend operators may implement the foregoing client operations, where the various backend operators may differ based on the type of object.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method of managing a file system, the method comprising:
receiving, by a backend storage system that manages the file system storing objects representative of data, a plurality of client operations to perform with respect to objects identified by the client operations, wherein the objects identified have associated functions that differ based on an object type of a corresponding object;
identifying, by the backend storage system, the object type for each of the objects identified by the client operations; and
applying, by a plurality of data processing units of the backend storage system and based on the object types, one or more backend operators to the objects identified by the client operations, wherein the one or more backend operators are selected based on the plurality of client operations, and wherein each data processing unit of the plurality of data processing units processes one or more of the client operations for one or more of the objects for which said data processing unit is listed as an owner.

2. The method of claim 1, wherein applying the one or more backend operators comprises:
serializing, by an owner processing unit of a first object of the objects identified by the client operations, a first backend operator of the one or more backend operators; and
applying, by the owner processing unit, the serialized first backend operator to the first object.

3. The method of claim 2, wherein serializing the first backend operator comprises reducing implementation of a lock with respect to the first object.

4. The method of claim 1,
wherein the plurality of client operations comprises a write client operation in which data represented by at least one of the objects identified by the client operations is written, and
wherein applying the one or more backend operators comprises applying, to implement the write client operation, a backend operator of the one or more of the backend operators without performing a sequence of operations that require a lock to be implemented by a frontend host system.

5. The method of claim 1, wherein the one or more backend operators comprise obtaining one or more locks with respect to individual objects of the objects identified by the client operations.

6. The method of claim 5, wherein the one or more locks comprise a lease lock that results in a token having an expiry time at which time the lease lock expires.

7. The method of claim 5, wherein the one or more locks comprise a persistent lock stored persistently along with the objects and that results in a token having no expiry time.

8. The method of claim 1, wherein the object types comprise one or more of a directory object type, an index node (Inode) object type, a data object type, or a superblock object type.

9. The method of claim 8, further comprising selecting, to be included in the one or more backend operators, one or more of a lookup operator to find an entry stored to a directory, an add operator to add a new entry to the directory, a delete operator to delete an existing entry from the directory, a list operator to list entries stored to the directory, or a rename operator to rename an entry stored to the directory.

10. The method of claim 8, further comprising selecting, to be included in the one or more backend operators, one or more of a get data object operator to retrieve a data object from an Inode object, a put data object operator to add a data object to the Inode object, a get attribute operator to obtain an attribute for the Inode object, a set attribute operator to set the attribute for the Inode object, an add reference object to add a reference to the Inode object, a delete reference operator to delete the reference from the Inode object, a delete operator to delete the Inode object, a lock operator to lock the Inode object, or an unlock operator to unlock the Inode object.

11. The method of claim 8, further comprising selecting, to be included in the one or more backend operators, one or more of a read operator to read data from a data object, a write operator to write data to the data object, or a delete operator to delete the data object.

12. The method of claim 8, further comprising selecting, to be included in the one or more backend operators, one or more of a stat operator to obtain statistics regarding a superblock object, or an add store operator to add a key value store to the superblock object.

13. The method of claim 1,
wherein the objects identified by the client operations include a superblock object that includes one or more key value stores that form the file system, and
wherein the method further comprises writing, during a snapshot in which a current state of the superblock object is saved, to an existing object of the objects identified by the client operations.

14. A backend storage system configured to manage a file system, the backend storage system comprising:
an interface configured to present the file system storing objects representative of data, and
one or more data processing units configured to:
receive a plurality of client operations to perform with respect to objects identified by the client operations, wherein the objects identified have associated functions that differ based on an object type of a corresponding object;
identify the object type for each of the objects identified by the client operations; and
apply one or more backend operators to the objects identified by the client operations, wherein the one or more backend operators are selected based on the plurality of client operations, and wherein each data processing unit of the one or more data processing units processes one or more of the client operations for one or more of the objects for which said data processing unit is listed as an owner.

15. The backend storage system of claim 14, wherein an owner processing unit of a first object of the objects identified by the client operations is configured to:
serialize a first backend operator of the one or more backend operators; and apply the serialized first backend operator to the first object.

16. The backend storage system of claim 15, wherein the owner processing unit is configured to serialize the first backend operator to reduce implementation of a lock with respect to the first object.

17. The backend storage system of claim 14,
wherein the plurality of client operations comprises a write client operation in which data represented by at least one of the objects identified by the client operations is written, and
wherein the one or more processing units are configured to apply, to implement the write client operation, a backend operator of the one or more of the backend operators without performing a sequence of operations that require a lock to be implemented by a frontend host system.

18. The backend storage system of claim 14, wherein the object types include one or more of a directory object type, an index node (Inode) object type, a data object type, or a superblock object type.

19. A storage device for storing computer-readable instructions that, when executed, cause one or more processors of a backend storage system to:
receive a plurality of client operations to perform with respect to objects identified by the client operations, wherein the objects identified have associated functions that differ based on an object type of a corresponding object;
identify the object type for each of the objects identified by the client operations; and
apply, by a plurality of data processing units, one or more backend operators to the objects identified by the client operations, wherein the one or more backend operators are selected based on the plurality of client operations, and wherein each data processing unit of the plurality of data processing units processes one or more of the client operations for one or more of the objects for which said data processing unit is listed as an owner.

* * * * *